(12) United States Patent
Mamidwar et al.

(10) Patent No.: US 11,895,173 B2
(45) Date of Patent: Feb. 6, 2024

(54) GAPPED AND/OR SUBSEGMENTED ADAPTIVE BITRATE STREAMS

(71) Applicant: Avago Technologies International Sales Pte. Limited, Singapore (SG)

(72) Inventors: Rajesh Mamidwar, San Diego, CA (US); Wade Wan, Villa Park, CA (US); Bryant Tan, Walnut, CA (US); Xuemin Chen, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/570,541

(22) Filed: Jan. 7, 2022

(65) Prior Publication Data

US 2023/0224351 A1 Jul. 13, 2023

(51) Int. Cl.
*G06F 15/16* (2006.01)
*H04L 65/75* (2022.01)
*H04L 65/70* (2022.01)
*H04L 65/61* (2022.01)

(52) U.S. Cl.
CPC .............. *H04L 65/75* (2022.05); *H04L 65/61* (2022.05); *H04L 65/70* (2022.05)

(58) Field of Classification Search
CPC .......... H04L 65/75; H04L 65/70; H04L 65/61
See application file for complete search history.

(56) References Cited

U.S. PATENT DOCUMENTS 10,432,690 B1 * 10/2019 Li ........................ H04L 65/612
10,681,104 B1 * 6/2020 Wu ................... H04N 21/26258
10,897,654 B1 * 1/2021 Wei ................... H04N 21/23418
10,958,947 B1 * 3/2021 Wei ..................... H04N 21/2407
11,101,906 B1 * 8/2021 Jiang ..................... H04H 20/12
11,146,839 B1 * 10/2021 Stroffolino .............. H04L 65/80
11,190,826 B1 * 11/2021 Labrozzi ............. H04N 21/2662
11,277,620 B1 * 3/2022 Liu ...................... H04N 19/184

(Continued)

FOREIGN PATENT DOCUMENTS

GB          2538531 A     11/2016
WO    WO-2018/146376 A1   8/2018

OTHER PUBLICATIONS

Extended European Search Report dated May 15, 2023, EP22210084.4-1208, 9 pages.

*Primary Examiner* — Oleg Survillo
(74) *Attorney, Agent, or Firm* — Quarles & Brady LLP

(57) ABSTRACT

Novel tools and techniques are provided for implementing encoding or decoding of adaptive bitrate streams. In various embodiments, one or more first computing systems may divide a live media content stream into one or more segments, each segment might include a starting segment boundary and an ending segment boundary. The one or more first computing systems might encode the one or more segments into one or more primary adaptive bitrate streams. The one or more first computing systems might also divide the one or more segments of the live media content stream into one or more subsegments. Each subsegment might be less than a length of a corresponding segment of the one or more segments. The one or more first computing systems might the encode and/or a second computing system might decode the one or more subsegments into or from one or more secondary adaptive bitrate streams.

20 Claims, 12 Drawing Sheets

(56) References Cited

U.S. PATENT DOCUMENTS

| | | | |
|---|---|---|---|
| 2013/0060956 A1 | 3/2013 | Nagaraj et al. | |
| 2014/0089990 A1* | 3/2014 | van Deventer | H04N 21/4728 725/115 |
| 2015/0189225 A1* | 7/2015 | Soroushian | H04N 7/0127 348/459 |
| 2016/0088047 A1* | 3/2016 | Mou | H04L 67/02 709/219 |
| 2016/0088054 A1* | 3/2016 | Hassan | H04L 65/762 709/219 |
| 2017/0374122 A1* | 12/2017 | Zhang | H04L 9/40 |
| 2018/0035139 A1* | 2/2018 | Giladi | H04L 65/762 |
| 2019/0007756 A1 | 1/2019 | Navali et al. | |
| 2020/0252663 A1* | 8/2020 | Giladi | H04N 21/8456 |
| 2021/0195259 A1* | 6/2021 | Giladi | H04N 21/4402 |
| 2021/0235140 A1* | 7/2021 | Han | H04N 21/234363 |
| 2021/0360260 A1* | 11/2021 | Rehman | H04N 19/154 |
| 2021/0368182 A1* | 11/2021 | Pandit | H04N 21/2402 |
| 2021/0385513 A1* | 12/2021 | Lintz | H04N 21/23439 |
| 2021/0400256 A1* | 12/2021 | Sireaev | H04N 21/44008 |
| 2022/0030247 A1* | 1/2022 | Olekas | H04N 19/60 |
| 2022/0167025 A1* | 5/2022 | Denoual | H04N 21/26258 |
| 2022/0264080 A1* | 8/2022 | Harviainen | H04N 19/597 |
| 2022/0264164 A1* | 8/2022 | Newton | H04N 21/2393 |
| 2022/0264168 A1* | 8/2022 | Dahl | H04L 65/612 |
| 2022/0272397 A1* | 8/2022 | Sturm | H04N 21/2404 |
| 2022/0329641 A1* | 10/2022 | Giladi | H04N 21/44029 |

* cited by examiner

GAPPED AND/OR SUBSEGMENTED ADAPTIVE BITRATE STREAMS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing encoding and decoding of media content streams, and, more particularly, to methods, systems, and apparatuses for implementing encoding and decoding of live adaptive bitrate media content streams.

BACKGROUND

Traditionally, streaming and media content services use adaptive bitrate ("ABR") streams to distribute media content stored in a network or cloud. ABR allows different media content players to pull media content streams from storage with different formats, different resolutions, and/or different bitrates depending on network capabilities, player capabilities, and/or the like. ABR media content streams can include formats or resolutions of 8K, 4K, high definition ("HD"), standard definition ("SD"), and/or the like. Each resolution of an ABR media content stream can also be distributed at different bitrates. As network speed and/or network traffic fluctuates, media content players can switch between the resolution and/or bitrate of an ABR media content stream at segment boundaries of the ABR media content stream.

However, for live media content streams, users can request the live media content stream and/or request to switch between live media content channels at any time. After requesting a live media content stream or a channel change between live media content channels, media content players can only start decoding at a segment boundary of the live ABR media content stream. When requesting a live media content stream or a channel change between live media content channels at a starting time different than a segment boundary, media content players only have two options: (1) wait for a current live segment of a live ABR media content stream to complete and start decoding the next segment at the next segment starting boundary of the live ABR media content stream; or (2) request the current segment of the live ABR media content stream from the beginning and start decoding at a starting segment boundary to display the live ABR media content stream immediately. Option 1 causes lag and/or latency because the media content player must wait to switch channels until the next segment of the live ABR media content stream starts. Option 2 introduces lag and/or latency into the live ABR media content stream because the media content player will display a media content stream that is behind the live media content stream being broadcast.

Hence, there is a need for more robust and scalable solutions for encoding and decoding of media content streams, and, more particularly, a need for more robust and scalable solutions for implementing encoding and decoding of live adaptive bitrate media content streams.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
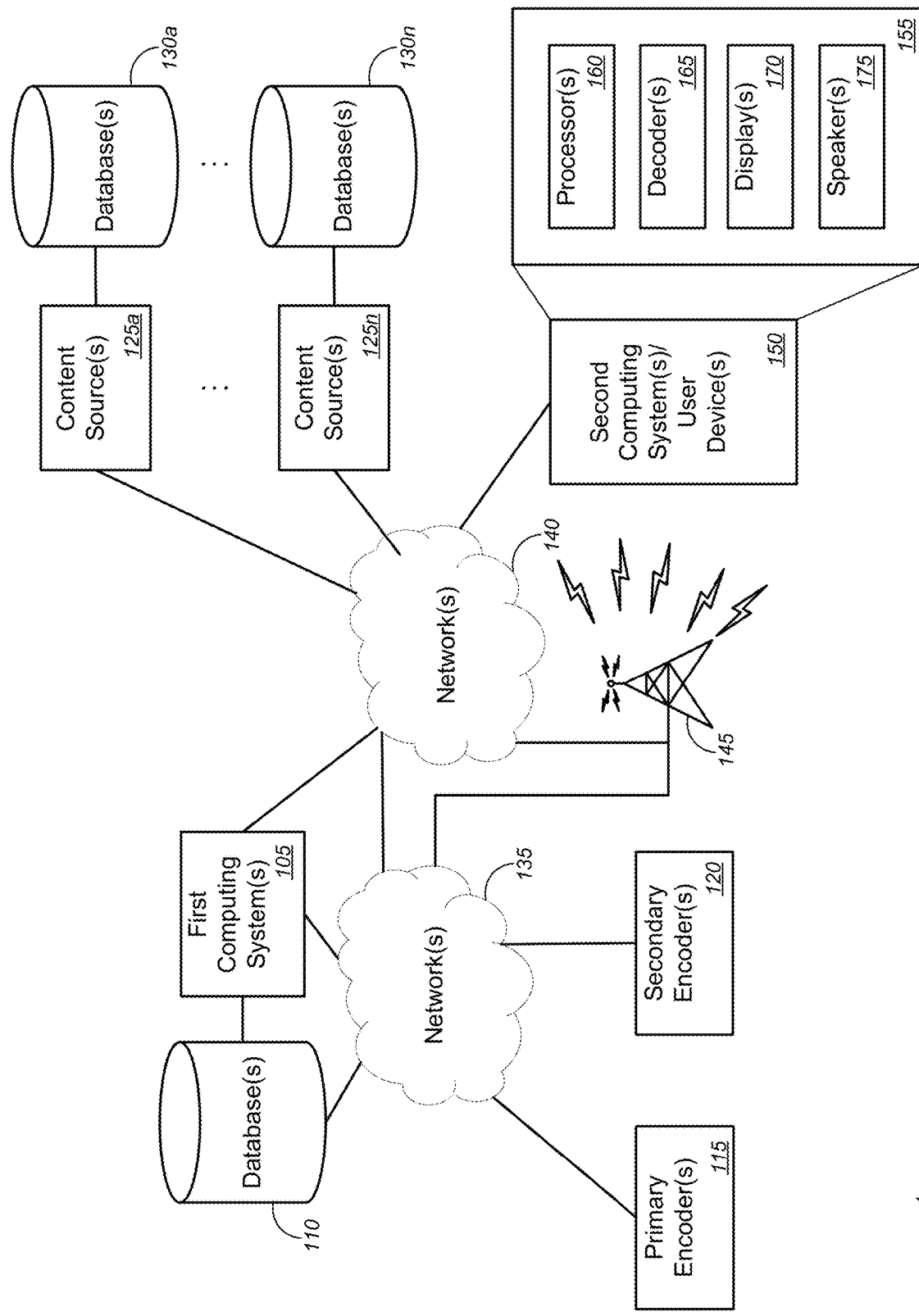
FIG. 1 is a schematic diagram illustrating a system for implementing encoding and decoding of live adaptive bitrate media content streams, in accordance with various embodiments.

Various embodiments provide tools and techniques for implementing encoding and decoding of media content streams, and, more particularly, to methods, systems, and apparatuses for implementing encoding and decoding of live adaptive bitrate media content streams.

In various embodiments, one or more first computing systems may divide a live media content stream into one or more segments, each segment might include a starting segment boundary and an ending segment boundary. The one or more first computing systems might encode the one or more segments of the live media content stream into one or more primary adaptive bitrate streams. The one or more first computing systems might also divide the one or more segments of the live media content stream into one or more subsegments. Each subsegment might be less than a length of a corresponding segment of the one or more segments. The one or more first computing systems might the encode the one or more subsegments into one or more secondary adaptive bitrate streams.

According to some embodiments, one or more second computing systems might receive a request for the live media content on a live channel. The one or more second computing systems might first request the one or more primary adaptive bitrate streams associated with the live media content. The one or more second computing systems might then determine that the one or more primary adaptive bitrate streams are not at a starting segment boundary. Based on a determination that the one or more primary adaptive bitrate streams are not at a starting segment boundary, the one or more second computing systems might request one or more secondary adaptive bitrate streams associated with the live media content. The one or more second computing systems might receive the one or more secondary adaptive bitrate streams including the one or more subsegments and decode the live media content associated with the one or more secondary bitrate streams.

In some cases, the one or more subsegments might have a different starting boundary than a corresponding starting segment boundary of a corresponding segment of the one or more segments and a same ending boundary as a corresponding ending segment boundary of the corresponding segment of the one or more segments. In some cases, the one or more subsegments may be continuous subsegments, discontinuous subsegments, overlapping subsegments, and/or the like.

Several advantages may be realized by implementing the embodiments described herein. For example, when requesting a live media content stream or a channel change between live media content channels, the lag or latency time between when the media content is requested and when the media content is displayed may be reduced. Additionally, when requesting a live media content stream or a channel change between live media content channels, the lag or latency time between live media content and the decoded media content may be reduced. In summary, all embodiments described in this disclosure make channel change of live channels faster without adding end-to-end delay to the viewer of the live media content stream. Further, in some embodiments, the one or more subsegments may be transmitted unencrypted, at a lower resolution, at a lower bitrate, or with a less efficient or older codec than the one or more segments. These and other aspects of the tools and techniques for implementing encoding and decoding of media content streams, and, more particularly, the methods, systems, and apparatuses for implementing encoding and decoding of live adaptive bitrate media content streams are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, encoding and decoding technology, live media content distribution technology, network provisioning technology, network configuration technology, and/or the like. In other aspects, certain embodiments can improve the functioning of user equipment or systems themselves (e.g., encoding and decoding technology, live media content distribution technology, network provisioning technology, network configuration technology, etc.), for example, by, dividing a live media content stream into one or more segments, each segment comprising a starting segment boundary and an ending segment boundary; encoding, using one or more primary encoders, the one or more segments of the live media content stream into one or more primary adaptive bitrate streams; dividing the one or more segments of the live media content stream into one or more subsegments, each subsegment being less than a length of a corresponding segment of the one or more segments; encoding, using the one or more secondary encoders, the one or more subsegments into one or more secondary adaptive bitrate streams; requesting one or more primary adaptive bitrate streams associated with the live media content from the one or more primary encoders; determining that the one or more primary adaptive bitrate streams are not at the starting segment boundary; based on a determination that the one or more primary adaptive bitrate streams are not at a starting segment boundary, requesting one or more secondary adaptive bitrate streams associated with the live media content from one or more secondary encoders; receiving the one or more secondary adaptive bitrate streams comprising the one or more subsegments; decoding the live media content associated with the one or more secondary bitrate streams; and and/or the like.

In particular, to the extent any abstract concepts are present in the various embodiments, those concepts can be implemented as described herein by devices, software, systems, and methods that involve specific novel functionality (e.g., steps or operations), such as, dividing the one or more segments of the live media content stream into one or more subsegments, each subsegment being less than a length of a corresponding segment of the one or more segments;

requesting one or more primary adaptive bitrate streams associated with the live media content from the one or more primary encoders; determining that the one or more primary adaptive bitrate streams are not at the starting segment boundary; based on a determination that the one or more primary adaptive bitrate streams are not at a starting segment boundary, requesting one or more secondary adaptive bitrate streams associated with the live media content from one or more secondary encoders; receiving the one or more secondary adaptive bitrate streams comprising the one or more subsegments; decoding the live media content associated with the one or more secondary bitrate streams; and/or the like, to name a few examples, that extend beyond mere conventional computer processing operations. These functionalities can produce tangible results outside of the implementing computer system, including, merely by way of example, improved live media content distribution that is performed in an efficient real-time manner to reduce lag and latency when live media content is requested, to improve display of live media content, to improve requests for live media content channel changes, and/or the like, at least some of which may be observed or measured by customers and/or service providers.

In an aspect, a method may comprise, dividing, using a computing system, a live media content stream into one or more segments. In some cases, each segment might include a starting segment boundary and an ending segment boundary. The method may continue by encoding, using one or more primary encoders of the computing system, the one or more segments of the live media content stream into one or more primary adaptive bitrate streams; and dividing, using the computing system, the one or more segments of the live media content stream into one or more subsegments. Each subsegment may be less than a length of a corresponding segment of the one or more segments. The method may additionally include encoding, using one or more secondary encoders of the computing system, the one or more subsegments into one or more secondary adaptive bitrate streams.

In some embodiments, the one or more primary adaptive bitrate streams might be one or more continuous segments of the live media content stream. In various instances, the one or more secondary adaptive bitrate streams might include at least one of one or more continuous subsegments of the live media content stream or one or more discontinuous subsegments of the live media content stream.

Merely by way of example, in some cases, the one or more subsegments might have a different starting boundary than a corresponding starting segment boundary of a corresponding segment of the one or more segments and a same ending boundary as a corresponding ending segment boundary of the corresponding segment of the one or more segments. In some instances, the one or more subsegments might be two or more subsegments. Each subsegment of the two or more subsegments may have a different subsegment starting boundary than a next subsegment starting boundary of a next subsegment. In various embodiments, the next subsegment starting boundary of the next subsegment may occur a predetermined amount of time after a preceding subsegment starting boundary of a preceding subsegment. Alternatively, or additionally, each subsegment of the two or more subsegments may be encoded by a single encoder or a separate encoder of the one or more secondary encoders.

In some instances, the method might further include releasing, using the computing system, the one or more secondary encoders when the one or more subsegments reach the same ending boundary as the corresponding segment of the one or more segments.

According to some embodiments, the one or more subsegments may overlap the ending segment boundary of the one or more segments and/or the one or more subsegments may overlap a next starting segment boundary of a next segment of the one or more segments. In some cases, the one or more subsegments may be transmitted unencrypted. Alternatively, or additionally, the one or more subsegments may be transmitted at a lower bitrate than the one or more segments.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive a request for live media content on a live channel; request one or more primary adaptive bitrate streams associated with the live media content from one or more primary encoders, the one or more primary adaptive bitrate streams including one or more segments, each segment including a starting segment boundary and an ending segment boundary; determine that the one or more primary adaptive bitrate streams are not at a starting segment boundary; based on a determination that the one or more primary adaptive bitrate streams are not at a starting segment boundary, request one or more secondary adaptive bitrate streams associated with the live media content from one or more secondary encoders, the one or more secondary adaptive bitrate streams including one or more subsegments, and each subsegment being less than a length of a corresponding segment of the one or more segments; receive the one or more secondary adaptive bitrate streams including the one or more subsegments; and decode the live media content associated with the one or more secondary bitrate streams.

In some embodiments, the request for the one or more secondary adaptive bitrate streams associated with the live channel from one or more secondary encoders further includes requesting a secondary adaptive bitrate stream of the one or more secondary adaptive bitrate streams comprising a subsegment of the one or more subsegments with a starting subsegment boundary closest to a real-time display time of the live media content.

In various instances, the one or more subsegments include a different starting boundary than a corresponding starting segment boundary of a corresponding segment of the one or more segments and a same ending boundary as a corresponding ending segment boundary of the corresponding segment of the one or more segments. In some cases, the set of instructions, when executed by the at least one processor, further causes the apparatus to: determine that the one or more subsegments of the one or more secondary adaptive bitrate streams have reached the same ending boundary as the corresponding ending segment boundary of the corresponding segment; based on a determination that the one or more subsegments of the one or more secondary bitrate streams have reached the same ending boundary, switch from at least one of the one or more secondary adaptive bitrate streams to at least one of the one or more primary adaptive bitrate streams; receive the at least one primary adaptive bitrate stream comprising the one or more segments; and decode the live media content associated with the at least one primary adaptive bitrate stream.

In some instances, the one or more secondary adaptive bitrate streams comprising the one or more subsegments may be received with a first video codec and the one or more primary adaptive bitrate streams may be received with a second video codec different than the first video codec. In some cases, the one or more primary adaptive bitrate streams may be generated with efficient/newer codec while the one or more secondary bitrate streams may be generated with less efficient codecs. The apparatus may be able to switch between codecs at any segment or subsegment boundary.

In some cases, the one or more subsegments might overlap the ending segment boundary of the one or more segments and/or the one or more subsegments may overlap a next starting segment boundary of a next segment of the one or more segments. When the one or more subsegments overlap the ending segment boundary of the one or more segments and/or the next starting segment boundary of the next segment of the one or more segments, the set of instructions, when executed by the at least one processor, might further cause the apparatus to: drop one or more overlapping subframes of the one or more subsegments, wherein the one or more overlapping subframes overlap between the one or more subsegments and the one or more segments. The one or more overlapping subframes may be dropped before the one or more overlapping subframes are decoded.

Alternatively, or additionally, when, the one or more subsegments overlap the ending segment boundary of the one or more segments and/or the next starting segment boundary of the next segment of the one or more segments, the set of instructions, when executed by the at least one processor, might further cause the apparatus to: receive at least one primary adaptive bitrate stream comprising the one or more segments; receive at least one secondary adaptive bitrate stream comprising the one or more subsegments; determine whether one or more overlapping subframes of the one or more subsegments are behind one or more real-time frames of the one or more segments; based on a determination that the one or more overlapping subframes of the one or more subsegments are behind the one or more real-time frames of the one or more segments, decode and display the one or more overlapping subframes faster to catch up to the one or more real-time frames of the one or more segments; and based on a determination that the one or more overlapping subframes of the one or more subsegments have caught up to the one or more real-time frames of the one or more segments, switch from at least one of the one or more secondary adaptive bitrate streams to at least one of the one or more primary adaptive bitrate streams.

Merely by way of example, in some cases, the set of instructions, when executed by the at least one processor, might further cause the apparatus to: determine whether one or more real-time frames of the one or more segments are not available; based on a determination that the one or more real-time frames of the one or more segments are not available, decode and display at least one of one or more subframes of the one or more subsegments slower until the one or more real-time frames are available or repeat one or more prior subframes of the one or more subsegments until the one or more real-time frames are available; and based on a determination that the one or more real-time frames are available, switch from at least one of the one or more secondary adaptive bitrate streams to at least one of the one or more primary adaptive bitrate streams.

In various embodiments, the one or more segments might include a header at the starting segment boundary. Each header may indicate one or more additional decodable segment boundaries indicating one or more additional locations within a corresponding segment where the apparatus can start decoding the live media content.

In yet another aspect, a system might comprise a first computing system, which might comprise one or more primary encoders, one or more secondary encoders, at least one first processor, and a first non-transitory computer readable medium communicatively coupled to the at least one first processor. The first non-transitory computer readable medium might have stored thereon computer software comprising a first set of instructions that, when executed by the at least one first processor, causes the first computing system to: divide a live media content stream into one or more segments, each segment including a starting segment boundary and an ending segment boundary; encode, using the one or more primary encoders, the one or more segments of the live media content stream into one or more primary adaptive bitrate streams; divide the one or more segments of the live media content stream into one or more subsegments, each subsegment being less than a length of a corresponding segment of the one or more segments; and encode, using the one or more secondary encoders, the one or more subsegments into one or more secondary adaptive bitrate streams.

In some cases, the system might further include a second computing system, which might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second computing system to: receive a request for live media content on a live channel; request one or more primary adaptive bitrate streams associated with the live media content from one or more primary encoders; determine that the one or more primary adaptive bitrate streams are not at a starting segment boundary; based on a determination that the one or more primary adaptive bitrate streams are not at a starting segment boundary, request one or more secondary adaptive bitrate streams associated with the live media content from one or more secondary encoders; receive the one or more secondary adaptive bitrate streams comprising the one or more subsegments; and decode the live media content associated with the one or more secondary bitrate streams.

Various modifications and additions can be made to the embodiments discussed without departing from the scope of the invention. For example, while the embodiments described above refer to particular features, the scope of this invention also includes embodiments having different combinations of features and embodiments that do not include all of the above described features.

Specific Exemplary Embodiments

We now turn to the embodiments as illustrated by the drawings. FIGS. 1-9 illustrate some of the features of the method, system, and apparatus for implementing encoding and decoding of media content streams, and, more particularly, of methods, systems, and apparatuses for implementing encoding and decoding of live adaptive bitrate media content streams, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a system 100 for implementing encoding and decoding of live adaptive bitrate ("ABR") media content streams, in accordance with various embodiments.

Although lines and lightning bolts are used to denote communicative couplings and/or connections (e.g., wireless and/or wired connections) between devices, one or more intermediary devices (not shown) and/or networks (not shown) may be located between the one or more devices of FIG. 1.

In the non-limiting embodiment of FIG. 1, system 100 might comprise a first computing system(s) 105 and a corresponding database(s) 110 with which first computing system(s) 105 might be communicatively coupled. In some embodiments, system 100 might further include one or more primary encoders 115 and one or more secondary encoders 120, and/or the like. Although the database(s) 110, the one or more primary encoders 115, and the one or more secondary encoders 120 are shown to be external to the first computing system 105, the various embodiments are not so limited and the database(s) 110, the one or more primary encoders 115, and/or the one or more secondary encoders 120 might be disposed within the first computing system 105. Additionally, although the one or more primary encoders 115 are designated as primary and the one or more secondary encoders 120 are designated as secondary, the one or more primary encoders 115 could also function as the one or more secondary encoders 120 and the one or more secondary encoders 120 could function as the one or more primary encoders 115. Further, although the one or more primary encoders 115 are designated as primary and the one or more secondary encoders 120 are designated as secondary, the terms "primary" and "secondary" are merely used to differentiate between encoders and are not intended to indicate a preference for a particular encoder, an amount a particular encoder is used or requested, and/or the like. In some cases, the one or more primary encoders 115, and/or the one or more secondary encoders 120 might be part of an encoder pool and be capable of being spun up when live media content is requested by one or more users or when live media content is currently being broadcast by a media content source(s) 125.

In various instances, each of the one or more primary encoders 115 and/or each of the one or more secondary encoders 120 may be set up to perform a same encoding task for different live media content. In a non-limiting example, each of the one or more primary encoders 115 and/or each of the one or more secondary encoders 120 may be set up to encode different live media content streams using at least one of a particular resolution, a particular bitrate, a particular codec, and/or the like. Alternatively, each of the one or more primary encoders 115 and/or each of the one or more secondary encoders 120 may split up and perform one or more different encoding tasks or a series of different encoding tasks on the same live media content. In some instances, the live media content stream may be split into one or more different chunks or one or more different frames for parallel encoding by the one or more primary encoders 115 and/or the one or more secondary encoders 120.

In some embodiments, the first computing system 105 might include, without limitation, a first processor (not shown) and a first memory (not shown). In some embodiments, the first computing system 105 may include, without limitation, one or more of a user device, a server computer, a server computer over a network, a cloud-based computing system, a cloud-based computing system over a network, or a distributed computing system, and/or the like.

System 100 might further comprise one or more media content sources 125a-125n (collectively, media content sources 125), each of which may be communicatively coupled to a corresponding database(s) 130a-130n (collectively, databases 130). The one or more media content sources 125 may be communicatively coupled to the first computing system 105 (or at least primary encoder(s) 115 and/or secondary encoder(s) 120 of the first computing system 105), primary encoder(s) 115, and/or secondary encoder(s) 120 via network(s) 135, 140, and/or 145 (through wireless and/or wired communications). The media content sources 125 might include, without limitation, one or more of a user device, a server computer, a server computer over a network, a content provider computer, a content provider computer over a network, a cloud-based computing system, a cloud-based computing system over a network, or a distributed computing system, and/or the like. In some cases, the first computing system 105, the one or more primary encoders 115, and/or the one or more secondary encoders 120 might be embodied or contained within the one or more content sources 125.

According to some embodiments, system 100 might further comprise second computing system(s), user interface device(s), or user device(s) 150 (collectively, second computing system(s) 150). The second computing system(s) may include, without limitation, one or more components 155. The one or more components 155 might include, without limitation, at least one of one or more processors 160, a memory (not shown), one or more decoders 165, one or more displays 170, and one or more speakers 175, and/or the like. In alternative embodiments, one or more of the components 155 of the second computing system(s) 150 might be embodied as separate components that may each be in communication with one or more other components. For instance, system 100 might include, but is not limited to, one or more decoders 165, one or more displays 170, and/or one or more speakers 175, and/or the like, and a second computing system 150 (optional), and/or the like, each of which might be stand-alone or separate components. In some cases, the second computing system(s) 150 may be, without limitation, at least one of a set-top box, a television, a server computer, a desktop computer, a laptop computer, a tablet computer, a smart phone, a cellphone, a mobile phone, a personal digital assistant, a remote-control device, a gaming console, or a portable gaming device, or any suitable device capable of communicating with first computing system(s) 105, primary encoders 115, secondary encoders 120, and/or content sources 125 via a web-based portal, an application programming interface ("API"), a server, a software application ("app"), or any other suitable communications interface, or the like.

System 100 might further comprise network(s) 135 and 140, which might communicatively couple at least one of the first computing system(s) 105, the database(s) 110, the primary encoder(s) 115, the secondary encoder(s) 120, the content source(s) 125, the database(s) 130, the second computing system 150, and/or the components of the secondary computing system(s) 150 and/or the like. In various instances, the first computing system(s) 105, the database(s) 110, the primary encoder(s) 115, the secondary encoder(s) 120, the content sources 125, the second computing system(s) 150 and/or the like may be communicatively coupled together within one or more service provider networks or one or more content provider networks. Alternatively, or additionally, the second computing system 150 may be located in a local area network.

The network(s) 135 and/or 140 might be service provider networks, content provider networks, local area networks, and/or the like. Each of the networks 135 and 140 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 135 or the network 140 might include an access network of the service provider (e.g., an Internet service provider ("ISP")), or the like.

In some embodiments, system 100 might also comprise one or more telecommunications relay systems 145, which might include, without limitation, one or more wireless network interfaces (e.g., wireless modems, wireless access points, and the like), one or more towers, one or more cellular towers, one or more satellites, and/or the like. The one or more telecommunications relay systems 145 might provide wired or wireless communications between the service provider (e.g., the first computing system(s) 105, the primary encoder(s) 115, the secondary encoder(s) 120, the content source(s) 125, etc.) and the second computing system(s) 150.

In operation, the first computing system(s) 105, the one or more primary encoders 115, and/or the one or more secondary encoders 120 might receive a live and/or real-time media content stream from at least one of the one or more media content sources 125 (and/or corresponding database(s) 130) via network(s) 135, 140, and/or 145. The live and/or real-time media content stream represents the display of live content as it is occurring in real-time or near real-time and is different from "on-demand" content which is previously recorded. In various instances, the live and/or real-time media content stream may have a slight time delay (e.g., 0.5 seconds, 1 second, 2 seconds, 5 seconds, 10 seconds, and/or the like) between when the live content occurs and when the live content is displayed in the live media stream. The live and/or real-time media content stream might include live video content from at least one of one or more live sporting events, live newscasts, live video streams, live television programs, and/or the like. In some cases, the live media content stream may include one or more adaptive bitrate ("ABR") streams. The ABR streams may include, but are not limited to, resolutions of 8K, 4K, high definition ("HD"), standard definition ("SD"), and/or the like. Each resolution of the ABR streams may also be distributed at different bitrates. In a non-limiting example, ABR streams may be transmitted at 5 Megabits per second ("Mbps"), 3 Mbps, 1 Mbps, 500 kilobits per second ("Kbps"), and/or the like.

The first computing system(s) 105, the one or more primary encoders 115, and/or the one or more secondary encoders 120 might receive the live media content stream in response to a request from the second computing system(s) 150 for the live media content stream. Alternatively, the first computing system 105, the one or more primary encoders 115, and/or the one or more secondary encoders 120 might receive the live media content stream from at least one of the one or more media content sources 125 (and/or corresponding database(s) 130) when the live media stream is occurring or being broadcast regardless of whether the second computing system(s) 150 sends a request for the live media content stream.

In some instances, the first computing system(s) 105 and the one or more primary encoders 115 might receive a primary live media content stream and/or a primary live ABR media content stream from at least one of the one or more media content sources 125 (and/or corresponding database(s) 130) and the first computing system(s) 105 and the one or more secondary encoders 120 might receive a secondary live media content stream and/or a secondary live ABR media content stream from at least one of the one or more media content sources 125. Although the one or more primary ABR streams are designated as primary and the one or more secondary ABR streams are designated as secondary, the terms "primary" and "secondary" are merely used to differentiate between media content streams and are not intended to indicate a preference for a particular ABR stream, an amount a particular ABR stream is used or requested, and/or the like. Alternatively, in some embodiments, the first computing system 105 and/or the one or more primary encoders 115 might convert a live media content stream from the at least one of the one or more media content sources 125 (and/or corresponding database(s) 130) into one or more primary live ABR media content streams and the first computing system 105 and/or the one or more secondary encoders 120 might convert the live media content stream and/or the one or more primary live ABR media content stream from at least one of the one or more media content sources 125 (and/or corresponding database(s) 130) into one or more secondary live ABR media content streams.

In various embodiments, the first computing system(s) 105, the one or more primary encoders 115, and/or the one or more media content sources 125 might divide the live media content stream and/or the one or more primary live ABR media content streams into one or more segments. Each segment may be divided into various sizes based on a predetermined amount of time (e.g., 5 seconds, 10 seconds, 15 seconds, and/or the like). Each segment might include a starting segment boundary and an ending segment boundary. The starting segment boundary of each segment might indicate a start time where the live media content stream(s) and/or the one or more primary live ABR media content streams can be decoded by decoder(s) 165 of the second computing system(s) 150. The ending segment boundary might indicate an end of the segment before the next decodable starting segment boundary of the one or more primary live ABR media content streams. The first computing system(s) 105, the one or more primary encoders 115, and/or the one or more media content sources 125 might then encode the one or more segments of the live media content stream into one or more primary live ABR media content streams.

In some instances, the first computing system(s) 105, the one or more secondary encoders 120, and/or the one or more media content sources 125 might divide the one or more segments of the live media content stream and/or the one or more primary live ABR media content streams into one or more subsegments. Each subsegment may be divided into various sizes based on a predetermined amount of time (e.g., 0.5 seconds, 1 second, 2 seconds, 5 seconds, 10 seconds, 15 seconds, and/or the like). Each subsegment may be less than a length of a corresponding segment of the one or more segments. In a non-limiting example, if a subsegment is 10 seconds in length, a subsegment may be 0.5 seconds, 1 second, 2 seconds, 5 seconds, 9 seconds, etc. Each subsegment might include a starting subsegment boundary and an ending subsegment boundary. The starting subsegment boundary of each subsegment might indicate a start time where the live media content stream(s) and/or the one or more secondary live ABR media content streams can be decoded by decoder(s) 165 of the second computing system(s) 150. The ending subsegment boundary might indicate an end of the subsegment. The first computing system(s) 105, the one or more secondary encoders 120, and/or the one or more media content sources 125 might then encode the one or more subsegments of the live media content stream(s) and/or the one or more primary live ABR media content streams into one or more secondary live ABR media content streams.

In various cases, the one or more subsegments might have subsegment starting boundaries that are different than a corresponding starting segment boundary of a corresponding segment of the one or more segments. Alternatively, or additionally, the one or more subsegments might have a same ending subsegment boundary as a corresponding ending segment boundary of the corresponding segment of the one or more segments. Alternatively, in some embodiments, the one or more subsegments may overlap the ending segment boundary of the one or more segments and/or the one or more subsegments may overlap the next starting segment boundary of the next segment of the one or more segments.

Each secondary live ABR media content stream and/or each subsegment of each secondary live ABR media content stream may be encoded by a single encoder or a separate encoder of the one or more secondary encoders 120. In other words, for each secondary live ABR media content stream, a corresponding separate or single encoder might be used to encode each secondary live ABR media content stream. In some cases, when the one or more subsegments reach an ending subsegment boundary, the one or more secondary encoders encoding the one or more secondary live ABR media content streams may be released back to an encoder pool.

In some embodiments, the one or more subsegments may be at least one of transmitted unencrypted, transmitted at a lower resolution, transmitted at a lower bitrate, or transmitted with a less efficient or older codec than the one or more segments.

Additionally, in operation, the second computing system(s) 150 might receive a request to receive and display a live media content stream. The request might be, without limitation, an initial request (e.g., turning on a display device, opening an application, selecting a particular television show or program, and/or the like) to receive the live media content stream or a channel change request to change a channel to the live media content stream, and/or the like. The second computing system(s) 150 might send the request for the live media content stream to the first computing system 105, the one or more primary encoders 115, the one or more secondary encoders 120, and/or the one or more media content sources 125.

The second computing system(s) 150 might next determine that the live media content and/or one or more primary live ABR media content streams of the live media content are not at a starting segment boundary. Based on a determination that the media content and/or the one or more primary live ABR streams are not at a starting segment boundary, the second computing system(s) 150 might request one or more secondary live ABR streams containing one or more subsegments associated with the live media content from the one or more secondary encoders 120. The request for the one or more secondary live ABR streams from one or more secondary encoders 120 might include requesting, using the second computing system(s) 150, a secondary live ABR stream of the one or more secondary live ABR streams containing a subsegment of the one or more subsegments with a starting subsegment boundary closest to a real-time display time of the live media content.

By requesting the one or more secondary live ABR streams from one or more secondary encoders 120, the lag or latency time between when the media content is requested and when the media content is displayed may be reduced because the second computing system(s) 150 does not need to wait until a next starting segment boundary of a next decodable segment of a primary live ABR stream becomes available. Additionally, by requesting the one or more secondary live ABR streams from one or more secondary encoders 120, the lag or latency time between live media content and the decoded media content may be reduced because the second computing system(s) 150 can request one or more subsegments with a starting subsegment boundary closest to a real-time display time of the live media content without having to decode one or more segments of a primary live ABR stream from the starting boundary of the segment.

The second computing system(s) 150 may then receive, via network(s) 135, 140, and/or 145, the one or more secondary live ABR streams comprising the one or more subsegments from the one or more secondary encoders 120. In some cases, in order to receive the one or more secondary live ABR streams, the one or more secondary encoders 120 might push the one or more secondary live ABR streams to the second computing system(s) 150. Alternatively, in order to receive the one or more secondary live ABR streams, the second computing system(s) 150 might pull the one or more secondary live ABR streams from the one or more secondary encoders 120.

The second computing system(s) might next decode, using decoder(s) 165, the one or more secondary live ABR streams comprising the one or more subsegments, and display, using the display(s) 170, the live media content associated with the one or more subsegments of the one or more secondary live ABR streams.

In some instances, the second computing system(s) 150 might determine that the one or more subsegments of the one or more secondary live ABR streams have reached the same ending boundary as the corresponding ending segment boundary of the corresponding segment. Based on a determination that the one or more subsegments of the one or more secondary live ABR streams have reached the same ending boundary, the second computing system(s) 150 might switch from receiving at least one of the one or more secondary live ABR streams from the one or more secondary encoders 120 to receiving at least one of the one or more primary live ABR streams from the one or more primary encoders 115. The second computing system(s) 150 might then receive the at least one primary live ABR stream comprising the one or more segments from the one or more primary encoders 115, decode the live media content associated with the at least one primary live ABR streams stream, and display the live media content associated with the at least one primary live ABR streams stream. In some cases, in order to receive the one or more primary live ABR streams, the one or more primary encoders 115 might push the one or more primary live ABR streams to the second computing system(s) 150. Alternatively, in order to receive the one or more primary live ABR streams, the second computing system(s) 150 might pull the one or more primary live ABR streams from the one or more primary encoders 115.

In some cases, the one or more secondary live ABR streams may be one or more dedicated side-channels separate from the one or more primary live ABR streams. In some cases, the one or more secondary ABR streams may be one or more unicast channels and/or multicast channels while the one or more primary live ABR streams may be one or more multicast channels. In a non-limiting example, if the primary live ABR stream is not at a segment boundary, the second computing system(s) 150 may pull the one or more secondary ABR streams which may be one or more dedicated multicast or unicast side channels and switch to the primary live multicast ABR stream at a starting segment boundary of the primary live multicast ABR stream.

In some cases, the second computing system(s) 150 might pull the one or more secondary live ABR streams with a different codec compared to the one or more primary live ABR streams. In some cases, the one or more primary adaptive bitrate streams may be generated with a more efficient/newer codec while the one or more secondary bitrate streams may be generated with less efficient/older codecs. The second computing system(s) 150 may be configured to switch between codecs at any segment or sub-segment boundary.

These and other functions of the system 100 (and its components) are described in greater detail below with respect to FIGS. 2-7.

Figure 2:
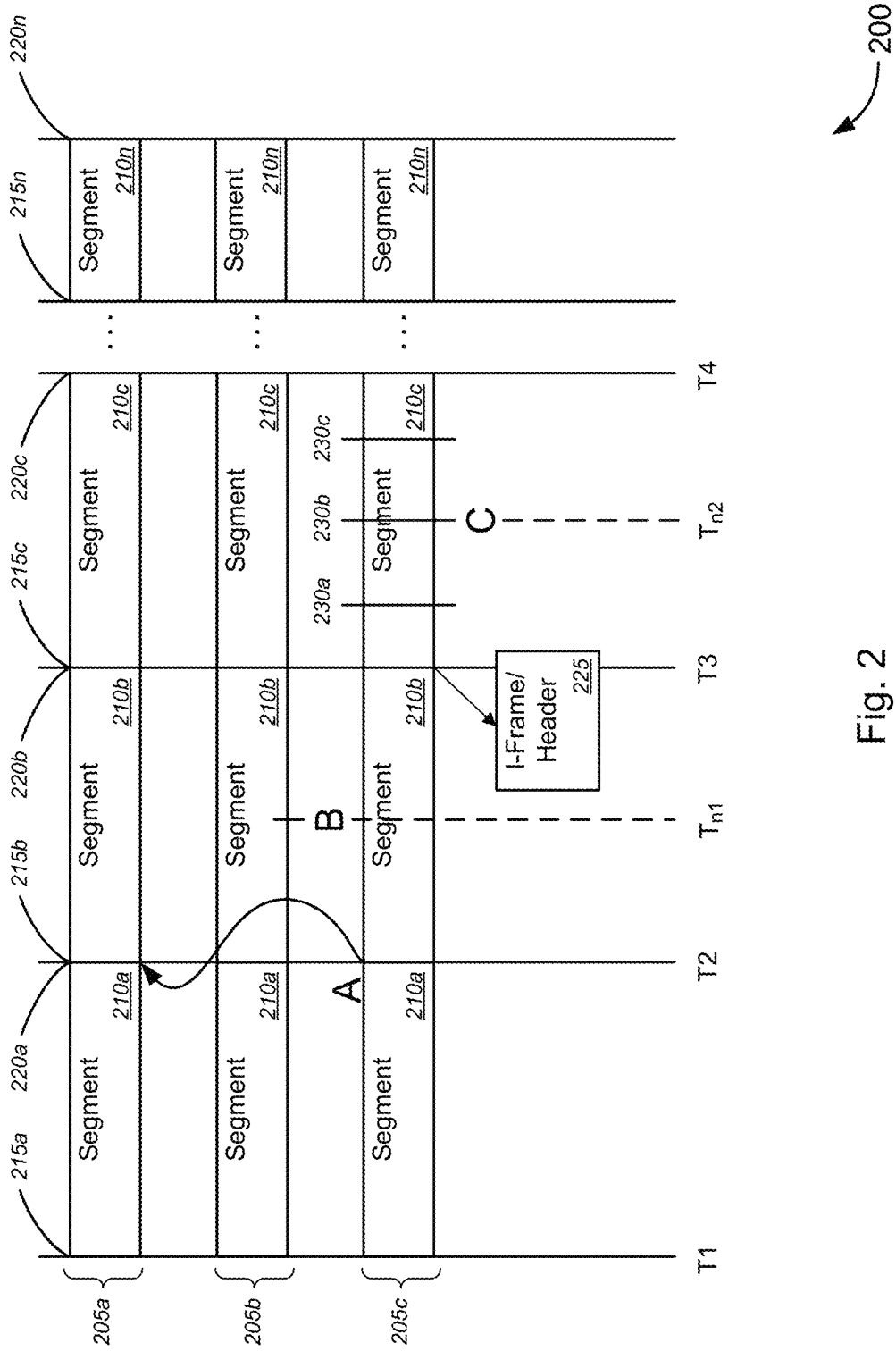
FIG. 2 is a schematic diagram illustrating an embodiment for implementing one or more adaptive bitrate streams, in accordance with various embodiments.

FIG. 2 is a schematic diagram illustrating an embodiment for implementing one or more adaptive bitrate streams 205, in accordance with various embodiments. FIG. 2 is intended to provide an illustrative perspective with respect to the implementation of one or more adaptive bitrate streams 205 with one or more segments 210, and is not limited to such functionalities, but may be applicable to some (if not all) of the functionalities described above with respect to FIG. 1, or the like and below with respect to FIGS. 3-7, or the like.

FIG. 2 depicts one or more live adaptive bitrate ("ABR") streams 205a, 205b, and 205c (collectively, ABR streams 205) that may be transmitted between a first computing system(s) (e.g., first computing system(s) 105 of FIG. 1), encoder(s) (e.g., primary encoder(s) 115 and/or secondary encoder(s) 120 of FIG. 1), and/or content sources (e.g., content sources 125 of FIG. 1) and a second computing system(s) (e.g., second computing system(s), user interface device(s), or user device(s) 150 of FIG. 1) and/or decoder(s) (e.g., decoder(s) 165 of FIG. 1). As live media content is being broadcast, a first computing system, encoder(s), and/or content sources might convert the live media content stream into the one or more live ABR streams 205.

In some embodiments, the one or more live ABR streams 205 may include, but are not limited to, formats or resolutions of 8K, 4K, high definition ("HD"), standard definition ("SD"), and/or the like. In a non-limiting example, live ABR stream 205a may be a 4K ABR stream, live ABR stream 205b may be an HD ABR stream, and live ABR stream 205c may be an SD ABR stream. Each resolution of the one or more live ABR streams 205 may also be distributed at different bitrates. In a non-limiting example, live ABR streams 205 may be transmitted at 5 Megabits per second ("Mbps"), 3 Mbps, 1 Mbps, 500 kilobits per second ("Kbps"), and/or the like. Each live ABR stream 205 may also be associated with different codecs. The codecs may include, without limitation, H.263, H.264, H.265, H.266, MPEG-1, MPEG-2, VP8, VP9, AAC, AV1, MP3, MP4, Theora, and/or the like.

In various cases, each live ABR stream 205 may be divided into one or more segments 210a, 210b, 210c, and 210n (collectively, segments 210). Each segment 210 may be divided into various sizes based on a predetermined amount of time (e.g., 5 seconds, 10 seconds, 15 seconds, and/or the like). Each segment might include a starting segment boundary 215 and an ending segment boundary 220. In a non-limiting example, segment 210a may have a starting segment boundary 215a and an ending segment boundary 220a. The starting segment boundary 215 of each segment 210 might indicate a start time when the live media content stream(s) and/or the one or more live ABR streams 205 can be decoded by decoder(s) of the second computing system(s). The ending segment boundary might indicate an end time of the segment before the starting boundary of the next decodable segment. In a non-limiting example, segment 210a may have a starting time of T1 and an ending time of T2.

In some instances, each segment 210 might start with an initial I-frame and/or header 225 indicating the start of time when and/or a starting boundary 215 where each segment 210 can be decoded by decoder(s) of the second computing system(s). The initial I-frame and/or header 225 might also indicate one or more additional times and/or additional boundaries 230a-230c within each segment 210 indicating a location where each segment 210 might be decoded and/or a location where a second computing system(s) can start decoding each segment 210. In a non-limiting example, segment 210c might additionally be decoded at 230a, 230b, and/or 230c.

In various embodiments, the second computing system(s) may transition or switch between the one or more ABR streams 205 at any segment starting boundary 215. For example, the second computing system(s) may switch between the one or more live ABR streams 205 to change a resolution (e.g., 8K, 4K, HD, SD, etc.), a bitrate (e.g., 100 Kbps, 500 Kbps, 1 Mbps, 5 Mbps, 10 Mbps, etc.), or a codec (e.g., H.263, H.264, H.265, H.266, MPEG-1, MPEG-2, VP8, VP9, AAC, AV1, MP3, MP4, Theora, etc.) of the one or more live ABR streams 205.

In operation, a first computing system, one or more primary encoders, and/or one or more media content sources might convert a live media content stream into one or more live ABR streams 205. The one or more live ABR streams 205 may then be divided into one or more segments 210. Next, the one or more primary encoders might encode the one or more live ABR streams 205 for transmission to a second computing system(s).

The second computing system(s) might request the one or more live ABR streams 205 and receive the one or more live ABR streams 205 from the first computing system(s), one or more primary encoders, and/or one or more media content sources. Upon receipt of the one or more live ABR streams 205 from the one or more primary encoders, one or more decoders of the second computing system(s) might decode and display the live media content associated with the one or more live ABR streams 205 at a decodable starting boundary 215 of the one or more segments 210.

In some cases, the decoders of the second computing system(s) may switch between the one or more ABR streams 205 at any segment starting boundary 215. In various embodiments, when the second computing system(s) determines that an improved resolution, bitrate, or codec is available, the second computing system(s) may switch between the one or more live ABR streams 205 at the one or more starting segment boundaries 215.

In a non-limiting example, as shown at line "A" of FIG. 2, if the second computing system(s) determines that 4K is available for a particular live media content stream, the second computing system(s) might switch between segment 210a of ABR stream 205c which may be an SD ABR stream to segment 210b of ABR stream 205a which may be a 4K ABR stream at ending segment boundary 220a, starting boundary 215b, and time T3.

In various embodiments, a user of the second computing system(s) might request a live media content stream at a time $T_{n1}$ and/or a time $T_{n2}$ that is not at a segment boundary (e.g., a starting segment boundary 215 and/or an ending segment boundary 220). This request is represented by line "B" or by line "C" in FIG. 2. The request might be, without limitation, an initial request (e.g., turning on a display device, opening an application, and/or the like) to receive the live media content stream or a channel change request to change a channel to live media content stream, and/or the like.

In order to service a request when a live media content stream is not at a segment boundary, the second computing system(s) may determine that the live media content and/or the one or more ABR streams 205 are not at a starting segment boundary 215. Based on a determination that the live media content and/or the one or more ABR streams 205 are not at a starting segment boundary 215, the second computing system(s) may request the segment 210 from the starting segment boundary 215, decode the segment 210 from the starting segment boundary 215, and fast forward and/or speed up the display of the decoded segment until the decoded ABR stream 205 catches up with the real-time or live media content stream.

In a non-limiting example, when a user of the second computing system(s) requests a live media content stream at a time $T_{n1}$ that is not at a segment boundary (represented by line "B"), the second computing system(s) may request the segment 210b from the starting segment boundary 215b, decode the segment 210b from the starting segment boundary 215b, and fast forward and/or speed up the display of the decoded segment 210b until the decoded ABR stream 205b catches up with the real-time live media content stream. In some cases, the fast forwarding and/or speeding up of the display of the decoded segment 210b may be imperceptible to a user of the second computing system. The fast forwarding and/or speeding up of the ABR stream 205b may be at 1.25 times, 2 times, and/or the like of the live media content stream. By fast forwarding and/or speeding up the display of the decoded segment 210b, channel change or requests of live channels may be faster without adding end-to-end delay to the viewer of the live media content Alternatively, in order to service a request when a live media content stream is not at a segment boundary, the second computing system(s) may determine that the live media content stream and/or the one or more ABR streams 205 are not at a starting segment boundary 215. Based on a determination that the media content and/or the one or more ABR streams 205 are not at a starting segment boundary 215, the second computing system(s) may request the segment 210 from the starting segment boundary 215 and process the initial I-frame and/or header 225 of the segment 210 to determine whether there are one or more additional decodable boundaries 230 within the one or more segments 210. Based on a determination that there are one or more additional decodable boundaries 230 within the one or more segments 210, the second computing system(s) may determine the additional decodable boundary that is closest to the real-time media content stream and decode and display the segment starting at the closest additional decodable boundary. In some cases, if the additional decodable boundary is still behind the real-time media content stream, the second computing system(s) may fast forward and/or speed up the display of the decoded segment until the decoded ABR stream catches up with the real-time media content stream.

In a non-limiting example, when a user of the second computing system(s), user interface device(s), or user device(s), and/or the like requests a live media content stream at a time $T_{n2}$ that is not at a segment boundary (represented by line "C"), the second computing system(s) may process the initial I-frame and/or header 225 of the segment 210c to determine whether there are one or more additional decodable boundaries 230a-230c within the segment 210c. Next, the second computing system(s) might determine the additional decodable boundary closest to the real-time media content stream. In this non-limiting example, the closest decodable boundary is 230b. Based on a determination of the closest decodable boundary 230b, the second computing system(s) may start decoding and start displaying the segment 210c at the closest additional decodable boundary 230b. In some cases, if the additional decodable boundary 230b is still behind the real-time media content stream, the second computing system(s) may fast forward and/or speed up the display of the decoded segment 210c until the decoded ABR stream 205c catches up with the real-time live media content stream. By requesting the additional decodable boundary 230b, channel change or requests of live channels may be faster without adding end-to-end delay to the viewer of the live media content.

Alternatively, or additionally, one or more other methods for servicing a request when a live media content stream is not at a segment boundary, are described in greater detail below with respect to FIGS. 3-5.

Figure 3:
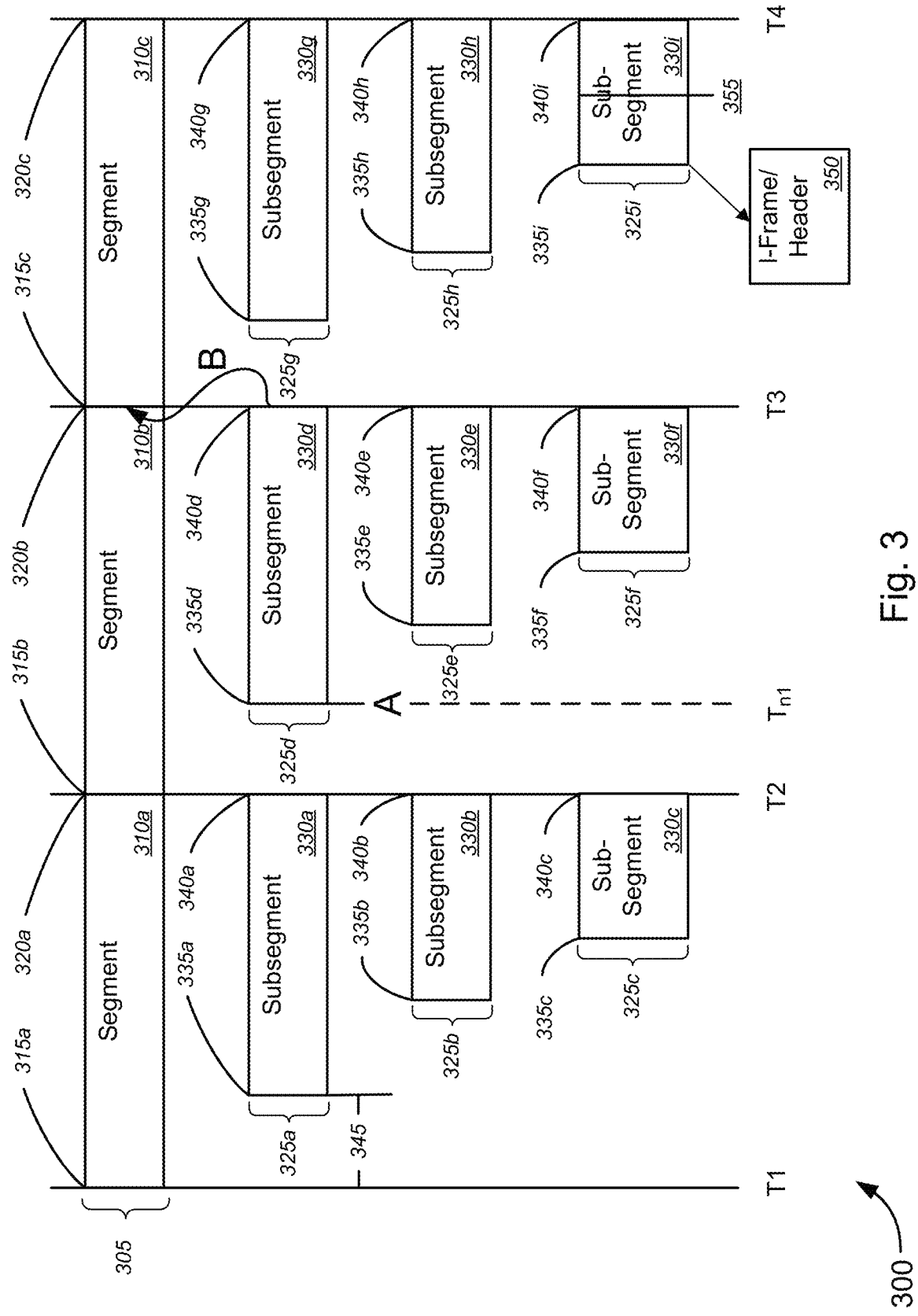
FIG. 3 is a schematic diagram illustrating an embodiment for implementing one or more primary adaptive bitrate streams comprising one or more segments and one or more secondary adaptive bitrate streams comprising one or more subsegments, in accordance with various embodiments.

Turning to FIG. 3, FIG. 3 is a schematic diagram illustrating an embodiment for implementing one or more primary adaptive bitrate streams 305 comprising one or more segments 310 and one or more secondary adaptive bitrate streams 325 comprising one or more subsegments 330, in accordance with various embodiments. FIG. 3 is intended to provide an illustrative perspective with respect to the implementation of the one or more primary adaptive bitrate streams 305 and the one or more secondary adaptive bitrate streams 325, and is not limited to such functionalities, but may be applicable to some (if not all) of the functionalities described above with respect to FIGS. 1 and 2, or the like or below with respect to FIGS. 1-7 or the like.

FIG. 3 depicts one or more live primary adaptive bitrate ("ABR") streams 305 that may be transmitted between a first computing system(s) (e.g., first computing system(s) 105 of FIG. 1), encoder(s) (e.g., primary encoder(s) 115 and/or secondary encoder(s) 120 of FIG. 1), and/or content sources (e.g., content sources 125 of FIG. 1) and a second computing system(s) (e.g., second computing system(s), user interface device(s), or user device(s) 150 of FIG. 1) and/or decoder(s) (e.g., decoder(s) 165 of FIG. 1). As live media content is being broadcast, a first computing system, encoder(s), and/ or content sources might convert the live media content stream into the one or more primary live ABR streams 305. In some embodiments, the one or more primary live ABR streams 305 may include, but are not limited to, resolutions of 8K, 4K, high definition ("HD"), standard definition ("SD"), and/or the like. Each resolution of the one or more primary live ABR streams 305 may also be distributed at different bitrates. In some embodiments, the one or more primary live ABR streams 305 may be transmitted at 5 Megabits per second ("Mbps"), 3 Mbps, 1 Mbps, 500 kilobits per second ("Kbps"), and/or the like. Each primary live ABR stream 305 may also be associated with a codec. The codec may include, without limitation, H.263, H.264, H.265, H.266, MPEG-1, MPEG-2, VP8, VP9, AAC, AV1, MP3, MP4, Theora, and/or the like.

In various cases, each live primary ABR stream may be divided into one or more segments 310a, 310b, and 310c (collectively, segments 310). Each segment 310 may be divided into various sizes based on a predetermined amount of time (e.g., 5 seconds, 10 seconds, 15 seconds, and/or the like). Each segment 310 might include a starting segment boundary 315 and an ending segment boundary 320. The starting segment boundary 315 of each segment 310 might indicate a start time when the live media content stream(s) and/or the one or more primary live ABR media content streams 305 can be decoded by decoder(s) of the second computing system(s). The ending segment boundary 320 might indicate an end time of the segment.

FIG. 3 further depicts one or more live secondary adaptive bitrate ("ABR") streams 325a-325i (collectively, live secondary adaptive bitrate ("ABR") streams 325) that may be transmitted between a first computing system(s), encoder(s), and/or content sources and a second computing system(s) and/or decoder(s). As live media content is being broadcast, the first computing system(s), encoder(s), and/or content sources, might convert the live media content stream and/or the one or more primary ABR streams 305 into the one or more secondary live ABR streams 325. Although the one or more primary ABR streams 305 are designated as primary and the one or more secondary ABR streams 325 are designated as secondary, the terms "primary" and "secondary" are merely used to differentiate between media content streams and are not intended to indicate a preference for a particular ABR stream, an amount a particular ABR stream is used or requested, and/or the like. In some embodiments, the one or more secondary live ABR streams 325 may include, but are not limited to, formats or resolutions of 8K, 4K, high definition ("HD"), standard definition ("SD"), and/or the like. Each resolution of the one or more secondary ABR streams 325 may also be distributed at different bitrates. In some embodiments, the one or more secondary ABR streams 325 may be transmitted at 5 Megabits per second ("Mbps"), 3 Mbps, 1 Mbps, 500 kilobits per second ("Kbps"), and/or the like. Each secondary live ABR stream 325 may also be associated with a codec. The codec may include, without limitation, H.263, H.264, H.265, H.266, MPEG-1, MPEG-2, VP8, VP9, AAC, AV1, MP3, MP4, Theora, and/or the like.

In various cases, each live secondary ABR stream 325 may be divided into one or more subsegments 330a-330i (collectively, subsegments 330). Each secondary ABR stream 325 may contain only one subsegment 330. Alternatively, each secondary ABR stream 325 may contain two or more subsegments 330. The one or more subsegments 330a-330i represent different ways to implement the one or more subsegments 330 and are not limited to only the implementations shown in FIG. 3.

Each subsegment 330 may be less than a length of a corresponding segment of the one or more segments 310. Each subsegment 330 may be divided into various sizes based on a predetermined amount of time (e.g., 1 second, 2 seconds, 5 seconds, 9 seconds, and/or the like). In a non-limiting example, if segment 210a is 10 seconds, then subsegment 330a might be 8 seconds, subsegment 330b may be 5 seconds, and subsegment 330c may be 2 seconds, and/or the like.

In some instances, each subsegment 330 might include a starting subsegment boundary 335 and an ending subsegment boundary 340. In a non-limiting example, subsegment 330a may have a starting subsegment boundary 335a and an ending subsegment boundary 340a. The starting subsegment boundary 335 of each subsegment 330 might indicate a start time when the live media content stream(s) and/or the one or more secondary live ABR media content streams 325 can be decoded by decoder(s) of the second computing system(s). The ending subsegment boundary 340 might indicate an end time of the subsegment. In a non-limiting example, subsegment 330d may have a starting time of $T_{n1}$ and an ending time of T3.

In various cases, the one or more subsegments 330 might have a different starting subsegment boundary 335 than a corresponding starting segment boundary 315 of a corresponding segment 310 creating one or more gaps 345 between the starting subsegment boundary 335 and a corresponding starting segment boundary 315 of a corresponding segment. Alternatively, or additionally, the one or more subsegments 330 might have a same ending boundary 340 as a corresponding ending segment boundary 320 of the corresponding segment 310. Because there are one or more gaps 345 between the starting subsegment boundary 335 and a corresponding starting segment boundary 315 of a corresponding segment 310, the one or more secondary live ABR streams 325 and/or one or more subsegments 330 may not be a continuous live media content stream and the one or more secondary live ABR streams 325 and/or one or more subsegments 330 be transmitted unencrypted by the one or more secondary encoders. Alternatively, or additionally, the one or more secondary live ABR streams 325 and/or one or more subsegments 330 may be transmitted at a lower resolution, a lower bitrate, and/or a less efficient or older codec than the one or more primary live ABR streams 305 and/or one or more segments 310.

In a non-limiting example, subsegment 330a might have a different starting subsegment boundary 335a than a corresponding starting segment boundary 315a of a corresponding segment 310a creating a gap 345 between the starting subsegment boundary 335a and a corresponding starting segment boundary 315a of a corresponding segment 310a. Alternatively, or additionally, the subsegment 330a might have a same ending boundary 340a as a corresponding ending segment boundary 320a of the corresponding segment 310a.

In some cases, a next subsegment starting boundary of a next subsegment may occur a predetermined amount of time after a preceding subsegment starting boundary of a preceding subsegment. In a non-limiting example, next subsegment starting boundary 335b of a next subsegment 330b may occur a predetermined amount of time after a preceding subsegment starting boundary 335a of a preceding subsegment 330a. In this way, the one or more subsegments 330 of the one or more secondary ABR streams 325 may be staggered and allow faster retrieval of a live media content stream.

In some instances, each subsegment 330 might start with an initial I-frame and/or header 350 indicating the start of time when and/or a starting boundary 335 where each subsegment 330 can start being decoded by decoder(s) of the second computing system(s). The initial I-frame and/or header 350 might also indicate one or more additional times and/or additional boundaries 355 within each subsegment 330 where each subsegment 310 might start being decoded. In a non-limiting example, segment 330i might additionally start being decoded at additional boundary 355.

In some instances, each of the one or more live secondary ABR streams 325 may be encoded by a single or separate secondary encoder. Additionally, in various cases, when the one or more live secondary ABR streams 325 reach a corresponding ending segment boundary 320, the single or separate secondary encoder may be released back to a pool of encoders until one or more new segments and/or subsegments need to be encoded.

In operation, a first computing system(s), one or more primary encoders, and/or one or more media content sources might convert a live media content stream into one or more primary live ABR streams 305. The one or more primary live ABR streams 305 may then be divided into one or more segments 310. Next, the one or more primary encoders might encode the one or more live primary ABR streams 305 for transmission to a second computing system(s).

The second computing system(s) might request the one or more primary live ABR streams 305 from the first computing system(s), one or more primary encoders, and/or one or more media content sources. In various embodiments, a user of the second computing system(s) might request a live media content stream at a time $T_{n1}$ that is not at a segment boundary (e.g., a starting segment boundary 315 and/or an ending segment boundary 320). This request is represented by line "A" in FIG. 3.

In order to service a request when a live media content stream and/or a primary live ABR stream 205 is not at a segment boundary 315 and/or 320, the second computing system(s) may determine that the media content and/or the one or more primary live ABR streams 305 are not at a starting segment boundary 315. Based on a determination that the media content and/or the one or more primary live ABR streams 305 are not at a starting segment boundary, the second computing system(s) may determine whether there are one or more secondary ABR streams 325 available from one or more secondary encoders, first computing system(s), and/or media content sources. Based on a determination that there are one or more secondary ABR streams 325 available, the second computing system(s) may determine the one or more decodable subsegment starting boundaries 335 and/or additional boundaries 355 that are closest to the real-time media content stream. Next, the second computing system(s) may decode and display the subsegment 330 that has a starting subsegment boundary 335 and/or additional boundary 355 that is closest to the real-time media content stream. In some cases, if the secondary live ABR stream 325 is still behind the real-time media content stream, the second computing system(s) may fast forward and/or speed up the display of the decoded subsegment until the decoded secondary ABR stream catches up with the real-time media content stream. By requesting one or more secondary live ABR streams 325, channel change or requests of live channels may be faster without adding end-to-end delay to the viewer of the live media content.

In a non-limiting example, represented by line "A" of FIG. 3, the second computing system(s) may receive a request for live media content at a start time of $T_{n1}$ and determine that the media content and/or the primary live ABR stream 305 is not at a starting segment boundary 315b. Based on a determination that the live media content stream and/or the primary live ABR stream 305 is not at a starting segment boundary 315, the second computing system(s) may determine whether there are one or more secondary ABR streams 325 available from one or more secondary encoders, first computing system(s), and/or media content sources. Based on a determination that there are one or more secondary ABR streams 325 available, the second computing system(s) may determine the one or more decodable subsegment starting boundaries 335 that are closest to the real-time media content stream and decode and display the subsegment 330d that has a starting subsegment boundary 335d that is closest to the real-time media content stream. In some cases, if the secondary live ABR stream 325d is still behind the real-time media content stream, the second computing system(s) may fast forward and/or speed up the display of the decoded subsegment 330d until the decoded secondary ABR stream 325d catches up with the real-time media content stream.

In various embodiments, the one or more decoders may switch between the one or more secondary ABR streams 325 at any ending subsegment boundary 340 and the one or more primary ABR streams at any segment starting boundary 315. In some cases, the second computing system(s) may determine when the one or more subsegments 330 reach an ending subsegment boundary 340 and switch from the one or more secondary ABR streams 325 to the one or more primary ABR streams 305. When the second computing system(s) switches from the one or more secondary ABR streams 325 to the one or more primary ABR streams 305, the one or more secondary encoders may be released back to an encoder pool.

In a non-limiting example, represented by line "B" of FIG. 3, the second computing system(s) may determine when subsegment 330d reaches ending subsegment boundary 340d. Based on a determination that subsegment 330d has reached an ending subsegment boundary 340d, the second computing system(s) may switch from the secondary ABR stream 325d to the primary ABR stream 305. In this way, the secondary ABR stream 325 acts as a dedicated side channel until the second computing system(s) can switch to the primary ABR stream 305.

In some cases, the one or more secondary live ABR streams 325 and/or one or more subsegments 330 may be received by the second computing system(s) at a lower resolution, a lower bitrate, and/or a less efficient or older codec than the one or more primary live ABR streams 305 and/or one or more segments 310. In some cases, based on a determination that subsegment 330d reached ending subsegment boundary 340d, the second computing system(s) may switch from the secondary ABR stream 325d having a lower resolution, a lower bitrate, and/or a less efficient or older codec to the primary ABR stream 305 having a higher resolution, a higher bitrate, and/or a more efficient or new codec. By requesting a lower resolution, a lower bitrate, and/or a less efficient or older codec secondary live ABR stream, channel change or requests of live channels may be faster without adding end-to-end delay to the viewer of the live media content.

Alternatively, or additionally, one or more other methods for servicing a request when a live media content stream is not at a segment boundary, are described in greater detail below with respect to FIG. 4.

Figure 4:
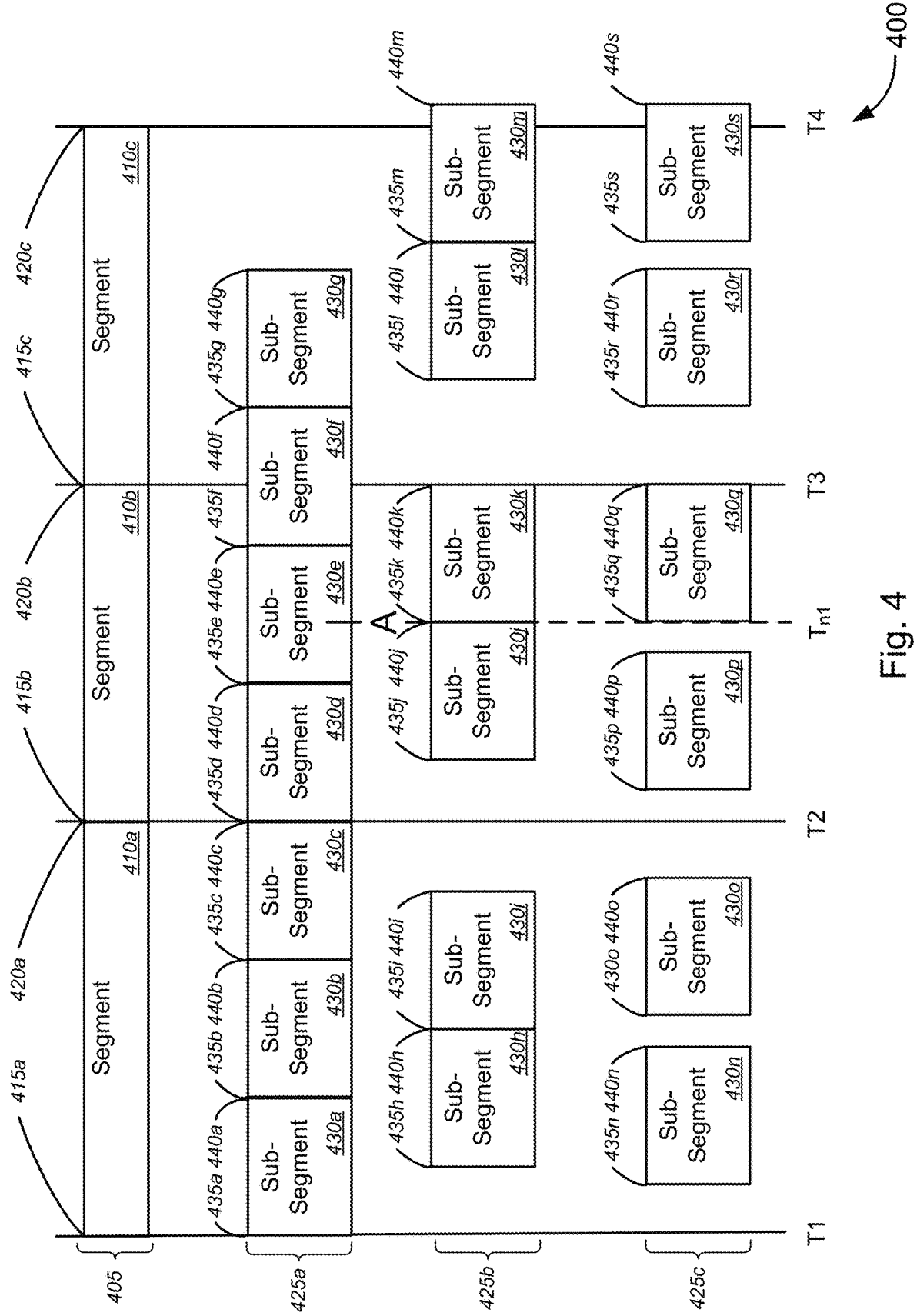
FIG. 4 is a schematic diagram illustrating another embodiment for implementing one or more primary adaptive bitrate streams comprising one or more segments and one or more secondary adaptive bitrate streams comprising one or more subsegments, in accordance with various embodiments.

Turning to FIG. 4, FIG. 4 is a schematic diagram illustrating an embodiment for implementing one or more primary adaptive bitrate streams 405 comprising one or more segments 410 and one or more secondary adaptive bitrate streams 425 comprising one or more subsegments 430, in accordance with various embodiments. FIG. 4 is intended to provide an illustrative perspective with respect to the implementation of the one or more primary adaptive bitrate streams 405 and the one or more secondary adaptive bitrate streams 425, and is not limited to such functionalities, but may be applicable to some (if not all) of the functionalities described above with respect to FIGS. 1, 2, 3, or the like or below with respect to FIGS. 5, 6, and 7 or the like.

FIG. 4 depicts one or more live primary adaptive bitrate ("ABR") streams 405 that may be transmitted between a first computing system(s) (e.g., first computing system(s) 105 of FIG. 1), encoder(s) (e.g., primary encoder(s) 115 and/or secondary encoder(s) 120 of FIG. 1), and/or content sources (e.g., content sources 125 of FIG. 1) and a second computing system(s) (e.g., second computing system(s), user interface device(s), or user device(s) 150 of FIG. 1) and/or decoder(s) (e.g., decoder(s) 165 of FIG. 1). As live media content is being broadcast, the first computing system, encoder(s) and/or content sources (e.g., content sources 125 of FIG. 1), might convert the live media content stream into the one or more primary ABR streams 405. In some embodiments, the one or more primary ABR streams 405 may include, but are not limited to, resolutions or formats of 8K, 4K, high definition ("HD"), standard definition ("SD"), and/or the like. Each resolution of the one or more primary ABR streams 405 may also be distributed at different bitrates and/or different codecs.

In various cases, each primary live ABR stream 405 may be divided into one or more segments 410*a*, 410*b*, and 410*c* (collectively, segments 410). Each segment 410 may be divided into various sizes based on a predetermined amount of time (e.g., 5 seconds, 10 seconds, 15 seconds, and/or the like). Each segment 410 might include a starting segment boundary 415 and an ending segment boundary 420. The starting segment boundary 415 of each segment 410 might indicate a start time when the live media content stream(s) and/or the one or more primary live ABR media content streams 405 can be decoded by decoder(s) of the second computing system(s). The ending segment boundary 420 might indicate an end time of the segment 410.

FIG. 4 further depicts one or more live secondary adaptive bitrate ("ABR") streams 425*a*-425*c* that may be transmitted between a first computing system(s) (e.g., first computing system(s) 105 of FIG. 1), encoder(s) (e.g., primary encoder(s) 115 and/or secondary encoder(s) 120 of FIG. 1), and/or content sources (e.g., content sources 125 of FIG. 1) and a second computing system(s) (e.g., second computing system(s), user interface device(s), or user device(s) 150 of FIG. 1) and/or decoder(s) (e.g., decoder(s) 165 of FIG. 1). As live media content is being broadcast, the first computing system, encoder(s), content sources might convert the live media content stream and/or the one or more primary ABR streams 405 into the one or more secondary ABR streams 425. The one or more secondary ABR streams 425 may be one or more side-channels separate from the one or more primary ABR streams 405. In some embodiments, the one or more secondary ABR streams 425 may include, but are not limited to, resolutions of 8K, 4K, high definition ("HD"), standard definition ("SD"), and/or the like. Each resolution of the one or more secondary ABR streams 425 may also be distributed at different bitrates and/or different codecs.

In various cases, each live secondary ABR stream 425 may be divided into one or more subsegments 430*a*-430*s* (collectively, subsegments 430). Each secondary ABR stream 425 may contain only one subsegment 430. Alternatively, each secondary ABR stream 425 may contain two or more subsegments 430. The one or more subsegments 430*a*-430*s* represent different ways to implement the one or more subsegments 430 and are not limited to only the implementations shown in FIG. 4.

Each subsegment 430 may be less than a length of a corresponding segment of the one or more segments 410. Each subsegment 430 may be divided into various sizes based on a predetermined amount of time (e.g., 1 second, 2 seconds, 5 seconds, 9 seconds, and/or the like).

In some instances, each subsegment 430 might include a starting subsegment boundary 435 and an ending subsegment boundary 440. The starting subsegment boundary 435 of each subsegment 430 might indicate a start time when the live media content stream(s) and/or the one or more secondary live ABR media content streams 425 can be decoded by decoder(s) of the second computing system(s). The ending subsegment boundary 440 might indicate an end time of the subsegment.

In some cases, the one or more subsegments 430 may be one or more continuous subsegments that evenly or unevenly divide into the one or more segments 410. In a non-limiting example, if segment 410*a* is 10 seconds, then subsegment 430*a* might be 3.33 seconds, subsegment 430*b* may be 3.33 seconds, and subsegment 430*c* may be 3.33 seconds, and/or the like. In another non-limiting example, if segment 410*a* is 10 seconds, then subsegment 430*a* might be 2 seconds, subsegment 430*b* may be 3 seconds, and subsegment 430*c* may be 5 seconds, and/or the like.

In some instances, the one or more subsegments 430 might have a first subsegment with a same starting subsegment boundary 435 as a corresponding starting segment boundary 415 of a corresponding segment 410 and a second subsegment with a same ending subsegment boundary 440 as a corresponding ending segment boundary 420 of a corresponding segment 410. In a non-limiting example, a first subsegment 430*a* might have a same starting subsegment boundary 435*a* as a corresponding starting segment boundary 415*a* of a corresponding segment 410*a* and a second subsegment 430*c* might have a same ending subsegment boundary 440*c* as a corresponding ending segment boundary 420*a* of a corresponding segment 410*a*.

In some instances, one or more continuous subsegments may not have a first subsegment with a same starting subsegment boundary 435 as a corresponding starting segment boundary 415 of a corresponding segment 410 and/or a second subsegment with a same ending subsegment boundary 435 as a corresponding ending segment boundary 420 of a corresponding segment 410. In a non-limiting example, continuous subsegments 430*h* and 430*i* may not have a first subsegment 430*h* with a same starting subsegment boundary 435*h* as a corresponding starting segment boundary 415*a* of a corresponding segment 410*a* and/or a second subsegment 430*i* with a same ending subsegment boundary 440*i* as a corresponding ending segment boundary 420*a* of a corresponding segment 410*a*.

In some instances, one or more continuous subsegments may not have a first subsegment with a same starting subsegment boundary 435 as a corresponding starting segment boundary 415 of a corresponding segment 410 and may have a second subsegment with a same ending subsegment boundary 440 as a corresponding ending segment boundary 420 of a corresponding segment 410. In a non-limiting example, one or more continuous subsegments may not have a first subsegment 430*j* with a same starting subsegment boundary 435*j* as a corresponding starting segment boundary 415*b* of a corresponding segment 410*b* and may have a second subsegment 430*k* with a same ending subsegment boundary 440*k* as a corresponding ending segment boundary 420*b* of a corresponding segment 410*b*.

In various embodiments, not shown, one or more continuous subsegments may have a first subsegment with a same starting subsegment boundary 435 as a corresponding starting segment boundary 415 of a corresponding segment 410 and may not have a second subsegment with a same ending subsegment boundary 440 as a corresponding ending segment boundary 420 of a corresponding segment 410.

Alternatively, in some cases, the one or more subsegments 430 may be one or more discontinuous subsegments that are located between the starting segment boundary 415 and the ending segment boundary 420. In a non-limiting example, discontinuous subsegments 430*n* and 430*o* might be located between the starting segment boundary 415*a* and the ending segment boundary 420a of segment 410a. In some cases, at least one of the discontinuous subsegments may have a same starting subsegment boundary 435 and/or a same ending subsegment boundary 440 as a corresponding segment 410. In some instances, one or more discontinuous subsegments may not have a first subsegment with a same starting subsegment boundary 435 as a corresponding starting segment boundary 415 of a corresponding segment 410 and/or a second subsegment with a same ending subsegment boundary 435 as a corresponding ending segment boundary 420 of a corresponding segment 410.

In some instances, one or more discontinuous subsegments may not have a first subsegment 430 with a same starting subsegment boundary 435 as a corresponding starting segment boundary 415 of a corresponding segment 410 and may have a second subsegment with a same ending subsegment boundary 440 as a corresponding ending segment boundary 420 of a corresponding segment 410. In a non-limiting example, one or more discontinuous subsegments 430p and 430q may not have a first subsegment 430p with a same starting subsegment boundary 435p as a corresponding starting segment boundary 415b of a corresponding segment 410b and may have a second subsegment 430q with a same ending subsegment boundary 440q as a corresponding ending segment boundary 420b of a corresponding segment 410b.

Alternatively, in other instances, the one or more continuous subsegments and/or discontinuous subsegments may overlap a starting boundary 415 of a next segment or an ending boundary 420 of a corresponding segment of the one or more segments 410. In a non-limiting example, subsegment 430f overlaps the ending segment boundary 420b of segment 410b and/or the starting segment boundary 415 of the next segment 410c, subsegment 430m overlaps the ending segment boundary 420c of segment 410c and/or the starting segment boundary of the next segment (not shown), and subsegment 430s overlaps the ending segment boundary 420c of segment 410c and/or the starting segment boundary of the next segment (not shown).

In some instances, the one or more continuous and/or discontinuous subsegments may be transmitted unencrypted by the one or more secondary encoders. Alternatively, or additionally, the one or more secondary live ABR streams 425 and/or one or more subsegments 430 may be transmitted at a lower resolution, a lower bitrate, and/or a less efficient or older codec than the one or more primary live ABR streams 405 and/or one or more segments 410.

In some instances, each of the one or more secondary live ABR streams 425 may be encoded by a single or separate secondary encoder. Additionally, in various cases, when the one or more secondary live ABR streams 425 reach a corresponding ending subsegment boundary 440, the single or separate secondary encoder may be released back to a pool of encoders until one or more new segments and/or subsegments need to be encoded. Alternatively or additionally, one or more continuous subsegments may be encoded by a same encoder. In a non-limiting example, subsegments 430a-430g may be encoded by the same encoder.

In operation, a first computing system(s), one or more primary encoders, and/or one or more media content sources might convert a live media content stream into one or more primary live ABR streams 405. The one or more primary live ABR streams 405 may then be divided into one or more segments 410. Next, the one or more primary encoders might encode the one or more live primary ABR streams 405 for transmission to a second computing system(s) and/or a decoder(s).

The second computing system(s) might request the one or more primary live ABR streams 405 from the one or more primary encoders. In various embodiments, a user of the second computing system(s) might request a live media content stream at a time that is not at a segment boundary (e.g., a starting segment boundary 415 and/or an ending segment boundary 420).

In order to service a request when a live media content stream and/or a primary live ABR stream 405 is not at a segment boundary 415 and/or 420, the second computing system(s) may determine that the media content and/or the one or more primary live ABR streams 405 are not at a starting segment boundary 415. Based on a determination that the media content and/or the one or more primary live ABR streams 405 are not at a starting segment boundary, the second computing system(s) may determine whether there are one or more secondary ABR streams 425 available from one or more secondary encoders. Based on a determination that there are one or more secondary ABR streams 425 available, the second computing system(s) may determine one or more decodable subsegment starting boundaries 435 that are closest to the real-time media content stream and decode and display the subsegment 430 that has a starting subsegment boundary 435 that is closest to the real-time media content stream. In some cases, if the secondary live ABR stream 425 is still behind the real-time media content stream, the second computing system(s), user interface device(s), or user device(s), and/or the like may fast forward and/or speed up the display of the decoded subsegment until the decoded secondary ABR stream 425 catches up with the real-time media content stream.

In a non-limiting example, represented by line "A" of FIG. 4, the second computing system(s) may receive a request for live media content at a start time of $T_{n1}$ and determine that the media content and/or the primary live ABR stream 405 is not at a starting segment boundary 415b. Based on a determination that the media content and/or the primary live ABR stream 405 is not at a starting segment boundary 415, the second computing system(s) may determine whether there are one or more secondary ABR streams 425 available from one or more secondary encoders. Based on a determination that there are one or more secondary ABR streams 425, the second computing system(s) may determine the one or more decodable subsegment starting boundaries 435 that are closest to the real-time media content stream and decode and display the subsegment 430e, 430k, and/or 430q that has a starting subsegment boundary 435e, 435k, and/or 435q that is closest to the real-time media content stream. In some cases, if the secondary live ABR stream 425a is still behind the real-time media content stream, the second computing system(s) may fast forward and/or speed up the display of the decoded subsegment 430e until the decoded secondary ABR stream 425a catches up with the real-time media content stream.

In various embodiments, the one or more decoders may switch between the one or more secondary ABR streams 425 at any starting subsegment boundary 435 and/or ending subsegment boundary 440 and the one or more primary ABR streams at any starting segment boundary 415. In some cases, the second computing system(s) may determine when the one or more subsegments 430 reach an ending subsegment boundary 440 and switch from the one or more secondary ABR streams 425 to the one or more primary ABR streams 405. In some cases, the second computing system(s) may determine when the one or more subsegments 430 reach a same ending subsegment boundary 440 as a same starting segment boundary 415 of a corresponding segment and switch from the one or more secondary ABR streams 425 to the one or more primary ABR streams 405. When the second computing system(s) switches from the one or more secondary ABR streams 425 to the one or more primary ABR streams 405, the one or more secondary encoders may be released back to an encoder pool.

In some instances, the one or more subsegments 430 may overlap a starting boundary 415 of a next segment or an ending boundary 420 of a corresponding segment the one or more segments 410. Based on a determination that the one or more subsegments 430 overlap a starting boundary 415 of a next segment or an ending boundary 420 of a corresponding segment, the second computing system(s) may determine one or more overlapping subframes of the one or more subsegments overlapping one or more segment frames of the next segment of the one or more segments. The second computing system(s) may determine that the one or more frames of the subsegment and the segment overlap based on a time or a timestamp associated with each frame in the segment and the subsegment. In some cases, the second computing system(s) may drop the one or more overlapping subframes of the one or more subsegments 430 and/or the one or more overlapping segment frames of the next segment. The one or more overlapping subframes and/or segment frames may be dropped before or after the one or more overlapping subframes and/or segment frames are decoded.

In a non-limiting example, subsegment 430f may overlap a starting boundary 415c of a next segment 410c or an ending boundary 420b of a corresponding segment 410b. Based on a determination that the subsegment 430f overlaps a starting segment boundary 415c of a next segment 410c or an ending segment boundary 420b of a corresponding segment 410b, the second computing system(s) may determine one or more overlapping subframes of subsegment 430f and/or overlapping segment frames of the next segment 410c. In some cases, the decoder may drop the one or more overlapping subframes of subsegment 430f and/or the one or more overlapping segment frames of the next segment 410c. In some cases, the decoder may drop the one or more overlapping subframes of subsegment 430f and/or the one or more overlapping segment frames of the next segment 410c based on a determination that the overlapping subframes of subsegment 430f and/or the one or more overlapping segment frames of the next segment 410c are the same.

In some cases, when or after the second computing system(s) requests a secondary live ABR stream 425 that is closest to a real-time media content stream, the second computing system(s) might also request at least one primary live ABR stream 405 comprising the next segment of the one or more segments 410 when it becomes available. Alternatively, the second computing system(s) may determine that the at least one primary live ABR stream 405 comprising the next segment of the one or more segments 410 will not be available before or when the one or more subsegments 430 reach an ending subsegment boundary 440.

When the at least one primary live ABR stream 405 comprising the next segment of the one or more segments 410 becomes available, the second computing system(s) might receive at the least one primary live ABR stream 405 comprising the next segment of the one or more segments 410. In some cases, the secondary live ABR stream 425 may be at an ending subsegment boundary 440 and the primary live ABR stream 405 might be at a starting segment boundary 415. In those cases, the second computing system(s) might switch from the secondary live ABR stream 425 to the primary live ABR stream 405 at the ending subsegment boundary 440 and the starting segment boundary 415. In a non-limiting example, a second computing system(s) might currently be displaying subsegment 430k and request the next segment 410c of the primary live ABR stream 405. The second computing system(s) might switch from the secondary ABR stream 425b to the primary ABR stream 405 at the ending subsegment boundary 440k and the starting segment boundary 415c.

Alternatively, in other cases, when the at least one primary live ABR stream 405 comprising the next segment of the one or more segments 410 becomes available, the second computing system(s) may determine that the one or more subsegments 430 currently being decoded overlap a starting boundary 415 of a next segment or an ending boundary 420 of a corresponding segment of the one or more segments 410. In some cases, the one or more secondary live ABR streams 425 may be synchronized (e.g., streaming the same frames in the segment 410 and the subsegment 430 at the same time) and/or desynchronized (e.g., not streaming the same frames in the subsegment 430 and the next segment 510 at the same time) with the one or more primary live ABR streams 405 and the second computing system(s) may drop the one or more synchronized and/or desynchronized overlapping subframes of the one or more subsegments 430 or the one or more synchronized and/or desynchronized overlapping segment frames of the next segment and switch to the at least one primary ABR stream 405.

In some embodiments, if the second computing system(s) is currently decoding subsegment 430f, the second computing system(s) may determine whether one or more subframes of the subsegment 430f are ahead of or behind the one or more segment frames of the next segment 410c. Based on a determination that the subsegment 430f is ahead of the one or more segment frames of the next segment 410c, the second computing system(s) might slow down the display of the subsegment 430f and/or speed up the decoding of the next segment 410c until the next segment 410c catches up to the subsegment 430f. Once the segment 410c catches up to the subsegment 430f, the decoder may switch from the secondary live ABR stream 425 to the primary live ABR stream 405.

Alternatively, based on a determination that the subsegment 430f is behind the one or more segment frames of the next segment 410c, the second computing system(s) might speed up the decoding and display of the subsegment 430f until the subsegment 430f catches up to the segment 410c. Once the subsegment 430f catches up to the segment 410c, the second computing system(s) may switch from the secondary live ABR stream 425 to the primary live ABR stream 405. In some cases, the second computing system(s) might speed up the decoding and display of the subsegment 430f until the subsegment 430f reaches ending subsegment boundary 440f, switch to the next segment 410c, and speed up decoding and display of the next segment 410c until the next segment 410c catches up to the real-time media content.

Alternatively, when the at least one primary live ABR stream 405 comprising the next segment of the one or more segments 410 is not available, the second computing system(s) may slow down display of the one or more subsegments 430 until the next segment becomes available. Alternatively, the second computing system(s) may repeat one or more prior subframes of the one or more subsegments 430 until the one or more live or real-time frames of the next segment are available. In various instances, the live and/or real-time frames may have a slight time delay (e.g., 0.5 seconds, 1 second, 2 seconds, 5 seconds, 10 seconds, and/or the like) between when the live content occurs and when the live frame is displayed in the live media stream. In a non-limiting example, the second computing system(s), user interface device(s), or user device(s), and/or the like may be currently decoding subsegment 430i. The second computing system(s), user interface device(s), or user device(s), and/or the like may determine that segment 410b will not be available by the time subsegment 430i reaches the ending subsegment boundary 440i. Based on a determination that that segment 410b will not be available by the time subsegment 430i reaches the ending subsegment boundary 440i, second computing system(s) may slow down display of the subsegment 430i until the segment 410b becomes available or repeat display of one or more prior subframes of the subsegment 430i until the one or more real-time frames of the next segment are available. Once the segment 410b becomes available, the decoder may switch from the secondary ABR stream 425b to the primary ABR stream 405.

Alternatively, or additionally, one or more other methods for servicing a request when a live media content stream including advertisements is not at a segment boundary, are described in greater detail below with respect to FIG. 5.

Figure 5:
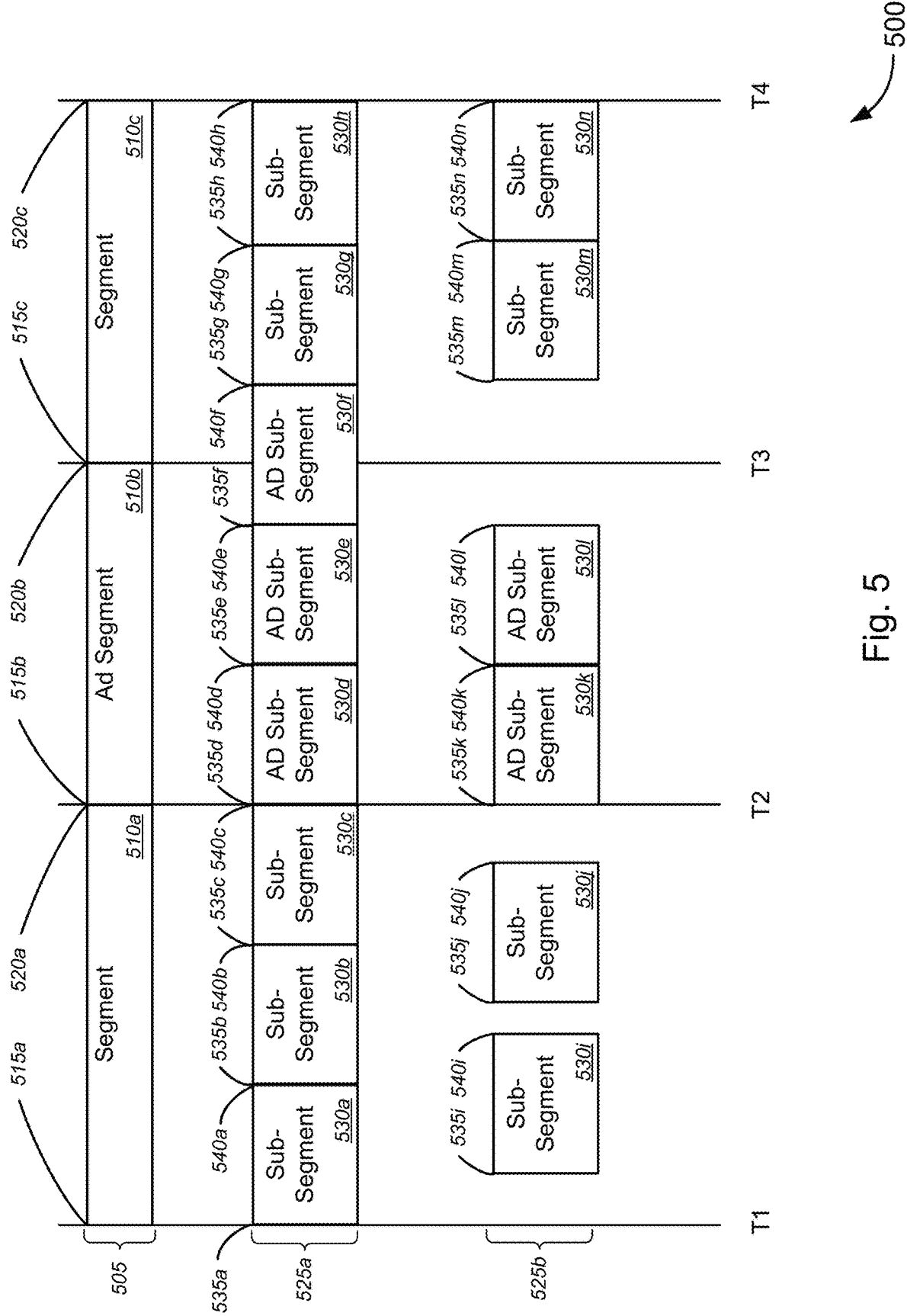
FIG. 5 is a schematic diagram illustrating yet another embodiment for implementing one or more primary adaptive bitrate streams comprising one or more advertisement segments and one or more secondary adaptive bitrate streams comprising one or more advertisement subsegments, in accordance with various embodiments.

Turning to FIG. 5, FIG. 5 is a schematic diagram illustrating an embodiment 500 for implementing advertisements in one or more primary adaptive bitrate streams 505 comprising one or more segments 510 and/or one or more secondary adaptive bitrate streams 525 comprising one or more subsegments 530, in accordance with various embodiments. FIG. 5 is intended to provide an illustrative perspective with respect to the implementation of the one or more primary adaptive bitrate streams 505 and the one or more secondary adaptive bitrate streams 525, and is not limited to such functionalities, but may be applicable to some (if not all) of the functionalities described above with respect to FIGS. 1, 2, 3, 4, or the like or below with respect to FIGS. 6 and 7, or the like.

FIG. 5 depicts one or more live primary adaptive bitrate ("ABR") streams 505 that may be transmitted between a first computing system(s) (e.g., first computing system(s) 105 of FIG. 1), encoder(s) (e.g., primary encoder(s) 115 and/or secondary encoder(s) 120 of FIG. 1), and/or content sources (e.g., content sources 125 of FIG. 1) and a second computing system(s) (e.g., second computing system(s), user interface device(s), or user device(s) 150 of FIG. 1) and/or decoder(s) (e.g., decoder(s) 165 of FIG. 1).

In various cases, each primary live ABR stream 505 may be divided into one or more segments 510a, 510b, and 510c (collectively, segments 410). In some cases, the primary ABR stream 505 might include one or more advertising segments 510b. Each segment 510 might include a starting segment boundary 515 and an ending segment boundary 520. In some cases, the starting segment boundary 515b of the advertisement segment 510b might indicate a start time of one or more advertisements in the one or more primary live ABR streams 505 and/or the one or more secondary live ABR streams 525.

FIG. 5 further depicts one or more live secondary adaptive bitrate ("ABR") streams 525a and 525b (collectively, secondary live ABR streams 525) that may be transmitted between a first computing system(s), encoder(s), and/or content sources and a second computing system(s) and/or decoder(s). As live media content is being broadcast, the first computing system, encoder(s), and/or content sources might convert the live media content stream and/or the one or more primary live ABR streams 505 into the one or more secondary live ABR streams 525. The one or more secondary ABR streams 525 may be one or more side-channels separate from the one or more primary ABR streams 505.

In various cases, each live secondary ABR stream 525 may be divided into one or more subsegments 530a-530n (collectively, subsegments 530). In some cases, one or more advertisement subsegments 530d-530f and/or 530k and 530l, and/or the like might be one or more advertising subsegments. Each subsegment 530 may be less than a length of a corresponding segment of the one or more segments 510.

In some instances, each subsegment 530 might include a starting subsegment boundary 535 and an ending subsegment boundary 540. The starting subsegment boundary 535 of each subsegment 530 might indicate a start time when the live media content stream(s) and/or the one or more secondary live ABR media content streams 525 can be decoded by decoder(s) of the second computing system(s). The ending subsegment boundary 540 might indicate an end time of the subsegment 530.

In operation, a first computing system, one or more primary encoders, and/or one or more media content sources might convert a live media content stream into one or more primary live ABR streams 505. The one or more primary live ABR streams 505 may then be divided into one or more segments 510. Next, the one or more primary encoders might encode the one or more live primary ABR streams 505 for transmission to a second computing system(s). In some cases, the one or more primary encoders might encode one or more advertisement segments 510b into the one or more live primary ABR streams 505. Alternatively, or additionally, one or more secondary encoders might encode one or more advertisement subsegments 530d-530f and/or 530k and 530l into the one or more live secondary ABR streams 525 for transmission to the second computing system(s).

The second computing system(s) might request the one or more primary live ABR streams 505 from the one or more primary encoders. In various embodiments, a user of the second computing system(s) might request a live media content stream at a time that is not at a segment boundary (e.g., a starting segment boundary 515 and/or an ending segment boundary 520). The request might be, without limitation, an initial request (e.g., turning on a display device, opening an application, and/or the like) to receive the live media content stream or a channel change request to change a channel to a live media content stream, and/or the like. Alternatively, the second computing system(s) might request one or more advertisement subsegments 530d-530f and/or 530k and 530l from one or more secondary ABR streams 525 when the primary ABR stream 505 reaches an advertisement starting boundary 515b. The one or more advertisement subsegments 530d-530f and/or 530k and 530l might be one or more local advertisements, one or more national advertisements, one or more international advertisements, and/or the like.

In order to service a request when a live media content stream and/or a primary live ABR stream 505 is not at a segment boundary 515 and/or 520 and/or when the primary ABR stream 505 reaches an advertisement starting segment boundary 515b, the second computing system(s) may determine whether there are one or more secondary ABR streams 525 available from one or more secondary encoders. Based on a determination that there are one or more secondary ABR streams 525, the second computing system(s) may determine the one or more decodable subsegment starting boundaries 535 that are closest to the real-time media content stream and decode and display the subsegment 530 that has a starting subsegment boundary 535 that is closest to the real-time media content stream.

In some instances, an advertisement subsegment 530f may overlap a starting boundary 515c of a next segment 510c or an ending boundary 520b of a corresponding segment 510b of the one or more segments 510. Based on a determination that the advertisement subsegment 530f overlaps a starting boundary 515c of a next segment 510c or an ending boundary 520b of a corresponding segment 510b of the one or more segments 510, the second computing system(s) may determine one or more overlapping subframes of the advertisement subsegment 530f overlapping one or more segment frames of the next segment 510c. The second computing system(s) may determine that the one or more frames of the advertisement subsegment 530f and the next segment 510c overlap based on a time or a timestamp associated with each segment and subsegment. In some cases, the second computing system(s) may drop the one or more overlapping subframes of the advertisement subsegment 530f and/or the one or more segment frames of the next segment 510c. The one or more overlapping subframes and/or segment frames may be dropped before or after the one or more overlapping subframes and/or segment frames are decoded.

In some cases, when the second computing system(s) requests a secondary ABR stream 525 that is closest to a real-time media content stream, the second computing system might also request at least one primary ABR stream 505 comprising the next segment of the one or more segments 510 when it becomes available. Alternatively, the second computing system(s) may determine that the at least one primary live ABR stream 505 comprising the next segment of the one or more segments 410 will not be available before or when the one or more advertisement subsegments 530d-530f and/or 530k or 530l reach an ending subsegment boundary 540d-540f and/or 540k or 540l.

When the at least one primary ABR stream 505 comprising the next segment 510c of the one or more segments 510 becomes available, the second computing system(s) might receive at the least one primary ABR stream 505 comprising the next segment 510c of the one or more segments 510. In some cases, the secondary ABR stream 525 may be at an ending subsegment boundary 540 and the primary ABR stream 505 might be at a starting segment boundary 515 (not shown). In those cases, the second computing system(s) might switch from the secondary ABR stream 525 to the primary ABR stream 505 at the ending subsegment boundary and the starting segment boundary.

Alternatively, in other cases, when the at least one primary ABR stream 505 comprising the next segment of the one or more segments 510 becomes available, the second computing system(s) may determine that the advertisement subsegment 530f currently being decoded overlaps a starting boundary 515c of a next segment 510c or an ending boundary 520b of a corresponding segment 510b of the one or more segments 510. In some cases, the one or more secondary ABR streams 525 may be synchronized (e.g., streaming the same frames in the advertisement subsegment 530f and the next segment 510c at the same time) and/or desynchronized (e.g., not streaming the same frames in the advertisement subsegment 530f and the next segment 510c at the same time) with the one or more primary ABR streams 505. The second computing system(s) may drop the one or more synchronized and/or desynchronized overlapping subframes of the advertisement subsegment 530f or the one or more synchronized and/or desynchronized overlapping segment frames of the next segment 510c and switch to the at least one primary ABR stream 505.

Alternatively, the second computing system(s) may determine whether one or more subframes of the advertisement subsegment 530f are behind the one or more segment frames of the next segment 510c. In other words the live media content may available, but the advertisement has not finished and is still being broadcast. Based on a determination that the advertisement subsegment 530f is behind the one or more segment frames of the next segment 510c, the second computing system(s) might speed up the decoding and display of the advertisement subsegment 530f until the advertisement subsegment 530f catches up to the segment 510c. Once the advertisement subsegment 530f catches up to the segment 510c, the second computing system(s) may switch from the secondary ABR stream 525 to the primary ABR stream 505. In some cases, the second computing system(s) might speed up the decoding and display of the advertisement subsegment 530f until the advertisement subsegment 530f reaches ending subsegment boundary 540f, switch to the next segment 510c, and speed up decoding and display of the segment 510c until the next segment 510c catches up to the real-time media content.

Alternatively, when the at least one primary ABR stream 505 comprising the next segment 510c of the one or more segments 510 is not available (e.g., when the advertisement is finished before the live media content is available), the second computing system(s) may slow down display of the one or more subsegments until the next segment becomes available. Alternatively, the second computing system(s) may repeat one or more prior subframes of the one or more subsegments until the one or more real-time frames of the next segment are available. In a non-limiting example, the second computing system(s) may be currently decoding and displaying advertisement subsegment 530l. The second computing system(s) may determine that segment 510c will not be available by the time advertisement subsegment 530l reaches the ending subsegment boundary 540l. Based on a determination that that segment 510c will not be available by the time advertisement subsegment 530l reaches the ending subsegment boundary 540l, second computing system(s) may slow down display of the advertisement subsegment 530l until the next segment 510c becomes available or repeat one or more prior subframes of the subsegment 530l until the one or more real-time frames of the next segment 510c are available. Once the next segment 510c becomes available, the second computing system(s) may switch from the secondary ABR stream 525b to the primary ABR stream 505.

Figure 6:
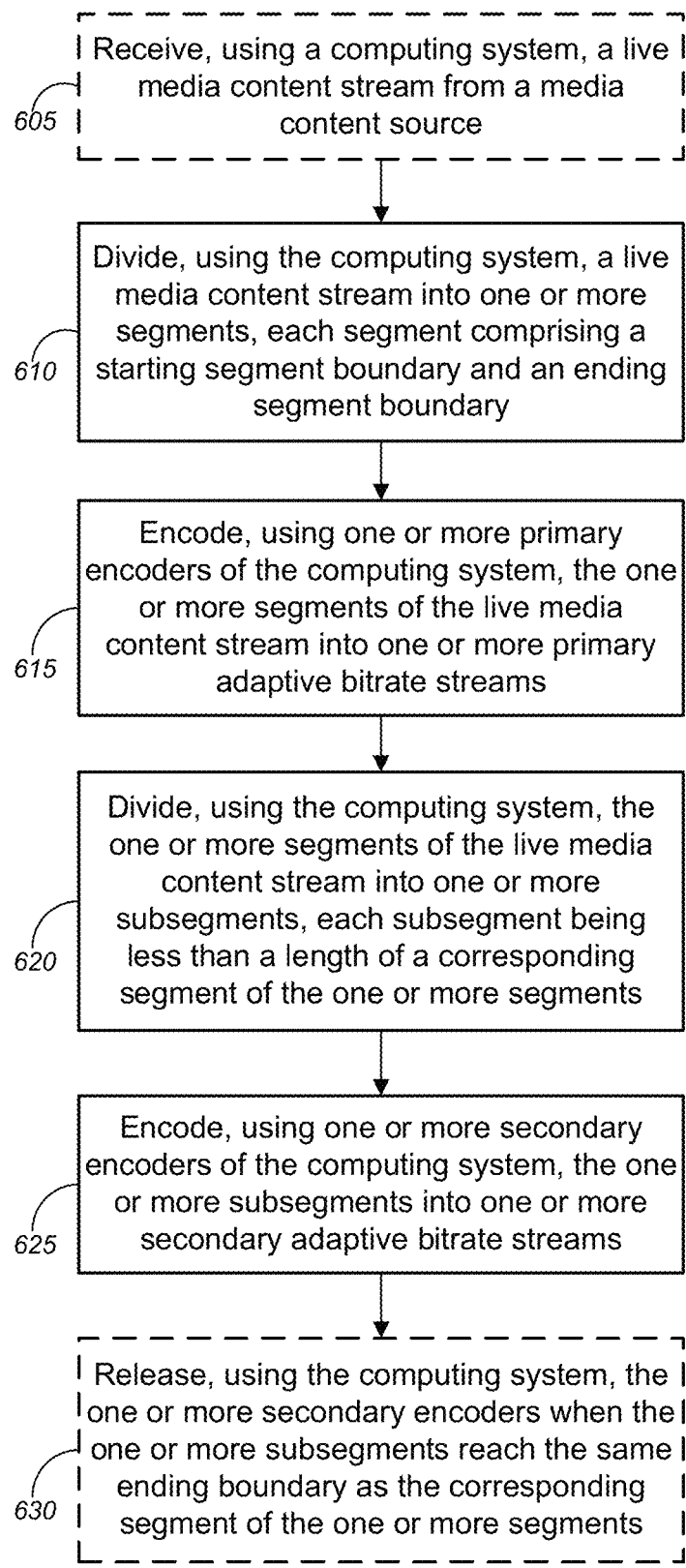
FIG. 6 is a flow diagram illustrating a method for implementing encoding of live adaptive bitrate media content streams, in accordance with various embodiments.

FIG. 6 is a flow diagram illustrating a method 600 for implementing encoding of live adaptive bitrate media content streams, in accordance with various embodiments. While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200, 300, 400, and 500 of FIGS. 1, 2, 3, 4, and 5, respectively (or components thereof), such methods may also be implemented using any suitable hardware (or software) implementation. Similarly, while each of the systems, examples, or embodiments 100, 200, 300, 400, and 500 of FIGS. 1, 2, 3, 4, and 5, respectively (or components thereof), can operate according to the method 600 illustrated by FIG. 6 (e.g., by executing instructions embodied on a computer readable medium), the systems, examples, or embodiments 100, 200, 300, 400, and 500 of FIGS. 1, 2, 3, 4, and 5 can each also operate according to other modes of operation and/or perform other suitable procedures.

In the non-limiting embodiment of FIG. 6, method 600, may comprise, at optional block 605, receiving, using computing system, a live media content stream from a media content source.

In some embodiments, the computing system might include, without limitation, a first processor and a first memory. In some embodiments, the computing system may include, without limitation, one of a user device, a server computer, a server computer over a network, a cloud-based computing system, a cloud-based computing system over a network, or a distributed computing system, and/or the like. In various cases, the media content sources might include, without limitation, one of a user device, a server computer, a server computer over a network, a content provider computer, a content provider computer over a network, a cloud-based computing system, a cloud-based computing system over a network, or a distributed computing system, and/or the like. The live media content stream might be a live video content stream and/or the like.

At block 610, method 600 may comprise dividing, using a computing system, a live media content stream into one or more segments. Each segment may be divided into various sizes based on a predetermined amount of time (e.g., 5 seconds, 10 seconds, 15 seconds, and/or the like). Each segment might include a starting segment boundary indicating a start time when the live media content stream(s) and/or the one or more primary live adaptive bitrate ("ABR") media content streams can be decoded by decoder(s) of the second computing system(s) and an ending segment boundary indicating an end time of the decodable segment.

In some cases, at block 615, method 600 might include dividing, using the computing system, the one or more segments of the live media content stream into one or more subsegments. Each subsegment may be less than a length of a corresponding segment of the one or more segments. Each subsegment may be divided into various sizes based on a predetermined amount of time (e.g., 1 second, 2 seconds, 5 seconds, 9 seconds, and/or the like). In a non-limiting example, if a corresponding segment is 10 seconds, then a first subsegment might be 8 seconds, a second subsegment may be 5 seconds, and a third subsegment may be 2 seconds, and/or the like.

In some instances, each subsegment might include a starting subsegment boundary and an ending subsegment boundary. In some cases, the starting subsegment boundary of each subsegment might indicate a start time when the subsegment, the live media content stream(s), and/or the one or more secondary live ABR media content streams can be decoded by a decoder(s) of a second computing system(s), user interface device(s), or user device(s), and/or the like. The ending subsegment boundary might indicate an end time of the segment.

In various cases, the one or more subsegments might have a different starting subsegment boundary than a corresponding starting segment boundary of a corresponding segment creating one or more gaps between the starting subsegment boundary and a corresponding starting segment boundary of a corresponding segment. Alternatively, or additionally, the one or more subsegments might have a same ending boundary as a corresponding ending segment boundary of the corresponding segment. Because there are one or more gaps between the starting subsegment boundary and a corresponding starting segment boundary of a corresponding segment, the one or more secondary live adaptive bitrate streams and/or one or more subsegments may not be a continuous live media content stream and the one or more secondary live adaptive bitrate streams and/or one or more subsegments be transmitted unencrypted by the one or more secondary encoders. Alternatively, or additionally, the one or more secondary live adaptive bitrate streams and/or one or more subsegments may be transmitted at a lower bitrate than the one or more primary live adaptive bitrate streams and/or one or more segments.

In other cases, a first subsegment of the one or more subsegments might have a same starting subsegment boundary as a corresponding starting segment boundary of a corresponding segment and a second subsegment of the one or more subsegments might have a same ending subsegment boundary as a corresponding ending segment boundary of a corresponding segment. Alternatively, or additionally, the one or more subsegments might have a same starting boundary as a corresponding starting segment boundary of the corresponding segment and a different ending subsegment boundary as a corresponding ending segment boundary of a corresponding segment.

In some instances, a first subsegment of the one or more subsegments might overlap a starting subsegment boundary of a corresponding starting segment boundary of a corresponding segment.

At block 625, method 600 may comprise, encoding, using one or more secondary encoders of the computing system, the one or more subsegments of the live media content stream into one or more secondary adaptive bitrate streams. In various embodiments, each subsegment and/or secondary adaptive bitrate stream may be encoded by a single and separate secondary encoder. When a subsegment of the one or more subsegments reaches an ending subsegment boundary, the method 600, at block 630 might continue by releasing, using the computing system, the one or more secondary encoders. In some cases, the one or more secondary encoders might be released back to an encoder pool.

FIGS. 7A-7D (collectively, FIG. 7) are flow diagrams illustrating a method 700 for implementing decoding of live adaptive bitrate media content streams, in accordance with various embodiments. Method 700 of FIG. 7 may be independent of or used in conjunction with method 600 of FIG. 6. Method 700 of FIG. 7A continues onto FIG. 7B following the circular marker denoted, "A." Method 700 of FIG. 7A alternatively or additionally continues onto FIG. 7C or FIG. 7D following the circular marker denoted, "B" and/or the circular marker denoted, "C."

Method 700 might begin at block 702 by receiving, with a computing system, a request for live media content. The request might be, without limitation, an initial request (e.g., turning on a display device, opening an application, selecting a particular television show or program, and/or the like) to receive the live media content stream or a channel change request to change a channel to live media content stream, and/or the like. The second computing system might send the request for the live media content stream to one or more primary encoders, one or more secondary encoders, and/or a one or more media content sources.

In some cases, the second computing system(s) may include, without limitation, at least one of one or more processors, a memory (not shown), one or more decoders, one or more displays, and one or more speakers, and/or the like. In some cases, the computing system may be, without limitation, at least one of a set-top box, a television, a server computer, a desktop computer, a laptop computer, a tablet computer, a smart phone, a cellphone, a mobile phone, a personal digital assistant, a remote-control device, a gaming console, or a portable gaming device, or any suitable device capable of communicating with one or more encoders and/or content sources via a web-based portal, an application programming interface ("API"), a server, a software application ("app"), or any other suitable communications interface, or the like.

Method 700 might continue onto optional block 704. At optional block 704, method 700 might comprise requesting, with the computing system, one or more primary adaptive bitrate streams associated with the live media content from one or more primary encoders. The one or more primary adaptive bitrate streams might include one or more segments. Each segment may be divided into various sizes based on a predetermined amount of time (e.g., 5 seconds, 10 seconds, 15 seconds, and/or the like). Each segment might include a starting segment boundary indicating a start time when the live media content stream(s) and/or the one or more primary live adaptive bitrate ("ABR") media content streams can be decoded by decoder(s) of the second computing system(s) and an ending segment boundary indicating an end time of the decodable segment.

At block 706, method 700 might include determining, with the computing system, that the one or more primary adaptive bitrate streams are not at the starting segment boundary. Based on a determination, that the one or more primary adaptive bitrate streams are not at a starting segment boundary, at block 708, method 700 might include requesting, with the computing system, one or more secondary adaptive bitrate streams associated with the live media content from one or more secondary encoders. The one or more secondary adaptive bitrate streams might include one or more subsegments.

Each subsegment may be less than a length of a corresponding segment of the one or more segments. Each subsegment may be divided into various sizes based on a predetermined amount of time (e.g., 1 second, 2 seconds, 5 seconds, 9 seconds, and/or the like). In a non-limiting example, if a corresponding segment is 10 seconds, then a first subsegment might be 8 seconds, a second subsegment may be 5 seconds, and a third subsegment may be 2 seconds, and/or the like.

In some instances, each subsegment might include a starting subsegment boundary and an ending subsegment boundary. In some cases, the starting subsegment boundary of each subsegment might indicate a start time when the subsegment, the live media content stream(s), and/or the one or more secondary live ABR media content streams can be decoded by a decoder(s) of a second computing system(s), user interface device(s), or user device(s), and/or the like. The ending subsegment boundary might indicate an end time of the segment.

In various cases, the one or more subsegments might have a different starting subsegment boundary than a corresponding starting segment boundary of a corresponding segment creating one or more gaps between the starting subsegment boundary and a corresponding starting segment boundary of a corresponding segment. Alternatively, or additionally, the one or more subsegments might have a same ending boundary as a corresponding ending segment boundary of the corresponding segment. Because there are one or more gaps between the starting subsegment boundary and a corresponding starting segment boundary of a corresponding segment 310, the one or more secondary live adaptive bitrate stream and/or one or more subsegments may not be a continuous live media content stream and the one or more secondary live adaptive bitrate stream and/or one or more subsegments be transmitted unencrypted by the one or more secondary encoders. Alternatively, or additionally, the one or more secondary live adaptive bitrate stream and/or one or more subsegments may be transmitted at a lower bitrate than the one or more primary live adaptive bitrate stream and/or one or more segments.

In other cases, a first subsegment of the one or more subsegments might have a same starting subsegment boundary as a corresponding starting segment boundary of a corresponding segment and a second subsegment of the one or more subsegments might have a same ending subsegment boundary as a corresponding ending segment boundary of a corresponding segment. Alternatively, or additionally, the one or more subsegments might have a same starting boundary as a corresponding starting segment boundary of the corresponding segment and a different ending subsegment boundary as a corresponding ending segment boundary of a corresponding segment.

In some instances, a first subsegment of the one or more subsegments might overlap a starting subsegment boundary of a corresponding starting segment boundary of a corresponding segment.

Method 700 might continue at block 710 by receiving, with the computing system, the one or more secondary adaptive bitrate streams comprising the one or more subsegments. Next, at block 712, the method 700 might decode, with the computing system the live media content associated with the one or more secondary bitrate streams. Additionally, the method 700, at block 714, might include displaying, with the computing system, the live media content associated with the one or more secondary bitrate streams.

Figure 7A:
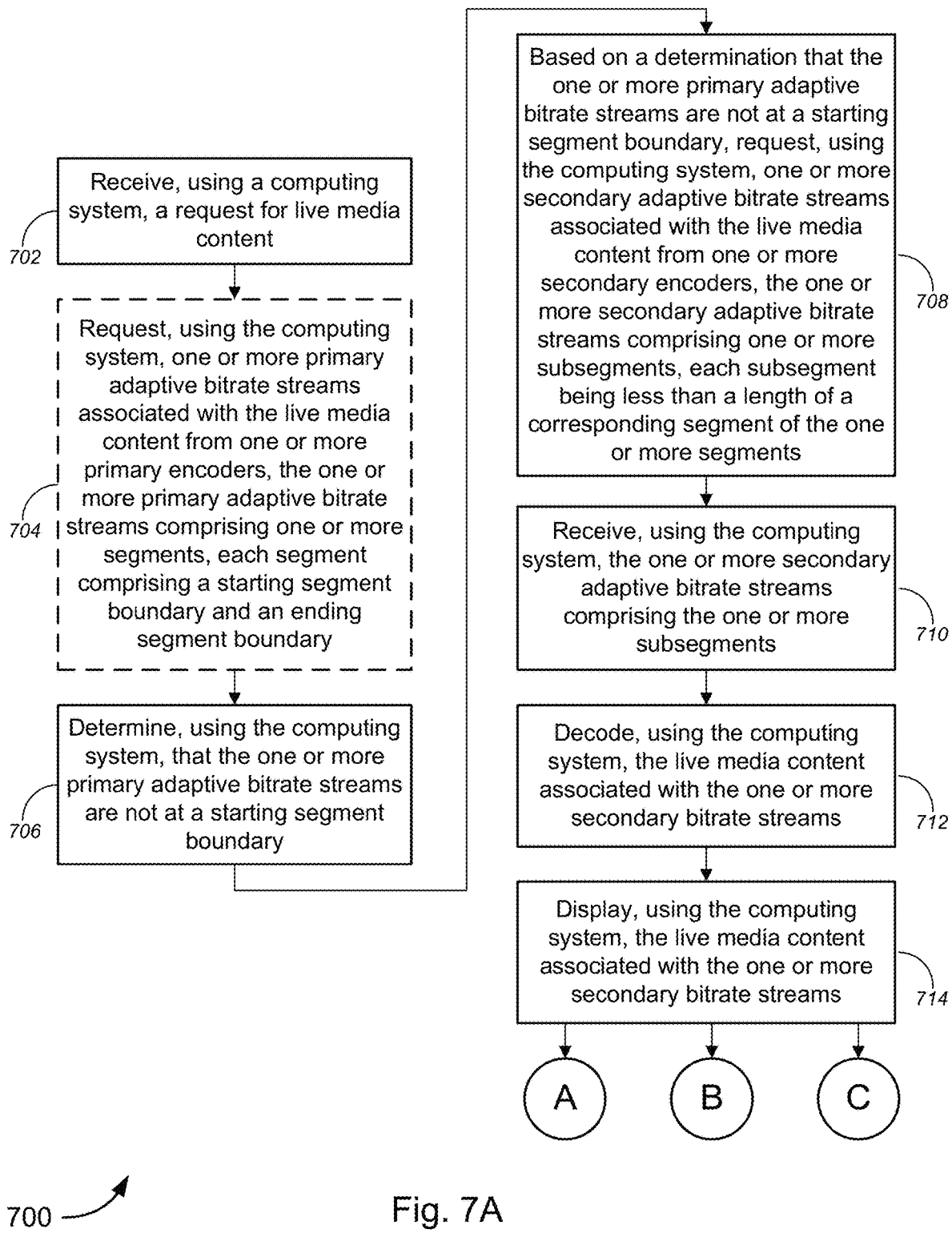
FIGS. 7A-7D are flow diagrams illustrating a method for implementing decoding of live adaptive bitrate media content streams, in accordance with various embodiments.
Figure 7B:
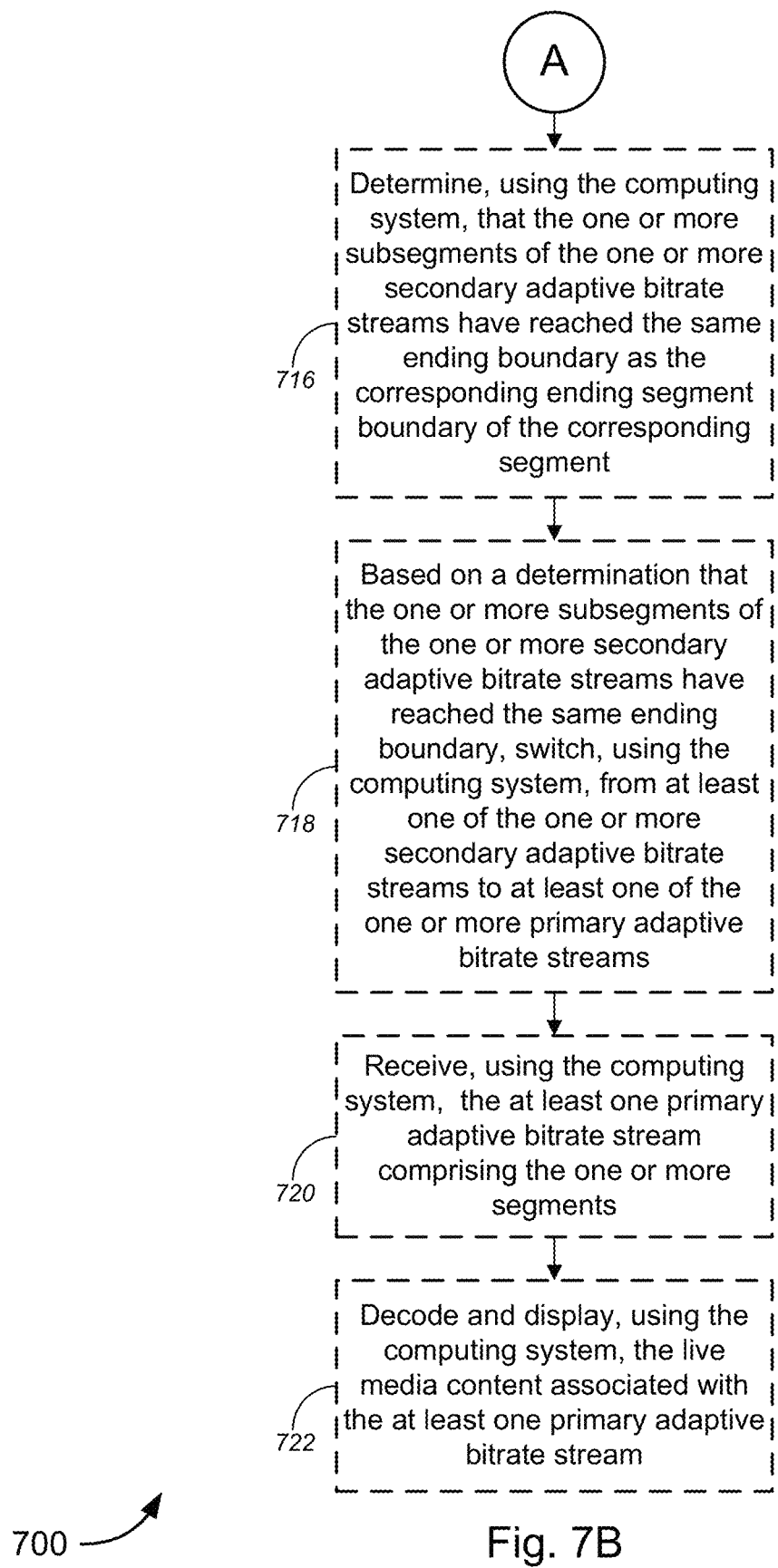
Figure 7C:
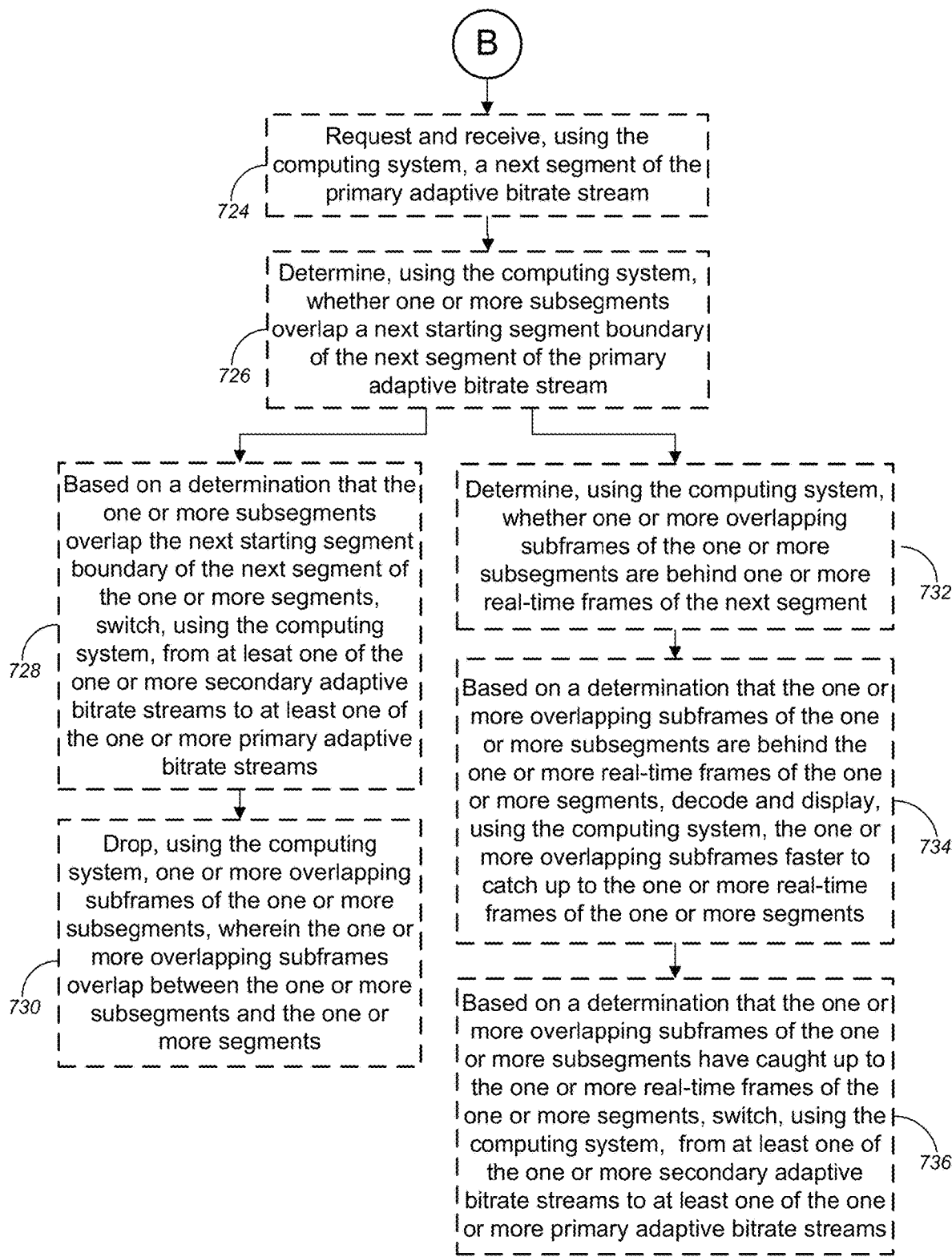
Figure 7D:
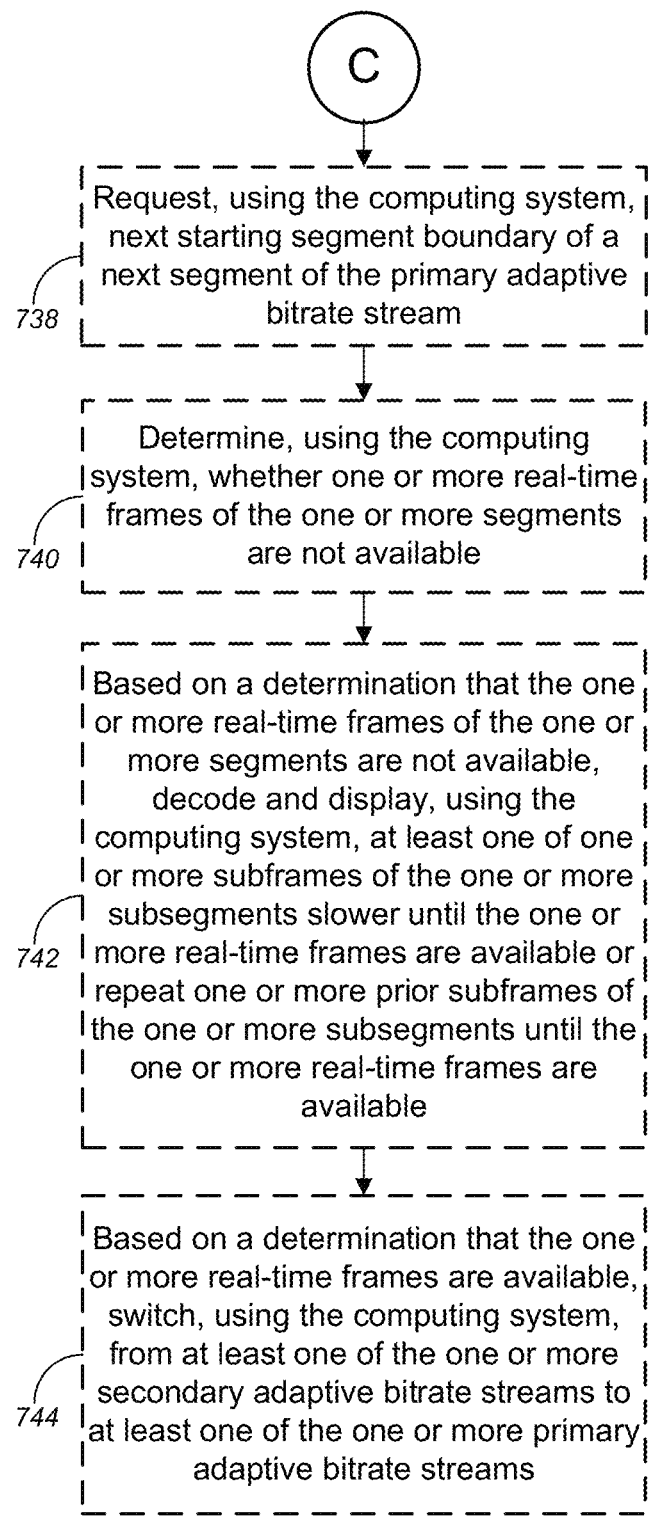

Method 700 either may continue onto the process at one of optional block 716 in FIG. 7B, optional block 724 in FIG. 7C, or optional block 738 in FIG. 7D, by following the circular marker denoted, "A."

Turning to FIG. 7B, at optional block 716 (following either the circular marker denoted, "A," in FIG. 7A), method 700 may comprise determining, using the computing system, that the one or more subsegments of the one or more secondary adaptive bitrate streams have reached a same ending boundary as the corresponding ending segment boundary of the corresponding segment. In some embodiments, based on a determination that the one or more subsegments of the one or more secondary adaptive bitrate streams have reached the same ending boundary, method 700, at optional block 718, might include switching, using the computing system, from at least one of the one or more secondary adaptive bitrate streams to at least one of the one or more primary adaptive bitrate streams. At optional block 720, method 700 might comprise receiving, using the computing system, the at least one primary adaptive bitrate stream comprising the one or more segments. At optional block 722, method 700 might include decoding and displaying, using the computing system, the live media content associated with the at least one primary adaptive bitrate stream.

Referring to FIG. 7C (following the circular marker denoted, "B" in FIG. 7A), method 700 may continue, at optional block 724, by requesting and receiving, using the computing system, a next segment of the primary adaptive bitrate stream. Next, the method 700, at block 726 might determine, using the computing system, whether one or more subsegments overlap a next starting segment boundary of the next segment of the one or more segments.

Based on a determination that the one or more subsegments overlap the next starting segment boundary of the next segment of the one or more segments, at optional block 728, the method 700 might include switching, using the computing system, from at least one of the one or more secondary adaptive bitrate streams to at least one of the one or more primary adaptive bitrate streams. In some cases, the computing system might switch from at least one of the one or more secondary adaptive bitrate streams to at least one of the one or more primary adaptive bitrate streams at the starting segment boundary of the next segment of the one or more primary adaptive bitrate streams.

At optional block 730, the method 700 might further comprise dropping, using the computing system, one or more overlapping subframes of the one or more subsegments overlapping the next starting segment boundary of the next segment of the one or more segments. In some cases, the one or more overlapping subframes may be dropped before the one or more overlapping subframes are decoded. Alternatively, the one or more overlapping subframes may be dropped after the one or more overlapping subframes are decoded.

Alternatively, or additionally, based on a determination that the one or more subsegments overlap the next starting segment boundary of the next segment of the one or more segments, at optional block 732, the method 700 might determine, using the computing system, whether one or more overlapping subframes of the one or more subsegments are behind one or more live or real-time frames of the next segment. In various instances, the live and/or real-time frames may have a slight time delay (e.g., 0.5 seconds, 1 second, 2 seconds, 5 seconds, 10 seconds, and/or the like) between when the live content occurs and when the live frame is displayed in the live media stream. Based on a determination that the one or more overlapping subframes of the one or more subsegments are behind the one or more real-time frames of the next segment, method 700, at block 734 might decode and display the one or more overlapping subframes faster to catch up to the one or more real-time frames of the next segment. Additionally, based on a determination that the one or more overlapping subframes of the one or more subsegments have caught up to the one or more real-time frames of the next segment, at optional block 736, method 700 might switch from the one or more secondary adaptive bitrate streams to the one or more primary adaptive bitrate streams.

Alternatively, with reference to FIG. 7D (following the circular marker denoted, "C" in FIG. 7A), method 700 may comprise, at optional block 738, requesting, using the computing system, a next segment of the primary adaptive bitrate stream. At optional block 740, the method 700 might include determining, using the computing system, whether one or more real-time frames of the one or more segments of the primary adaptive bitrate stream are not available. Based on a determination that the one or more real-time frames of the one or more segments are not available, at optional block 742, method 700 might include, decoding and/or displaying, using the computing system, at least one of one or more subframes of the one or more subsegments slower until the one or more real-time frames are available or repeat one or more prior subframes of the one or more subsegments until the one or more real-time frames are available. Next, based on a determination that the one or more real-time frames are available, at optional block 744, the method 700 might include switching, using the computing system, from at least one of the one or more secondary adaptive bitrate streams to at least one of the one or more primary adaptive bitrate streams.

Exemplary System and Hardware Implementation

Figure 8:
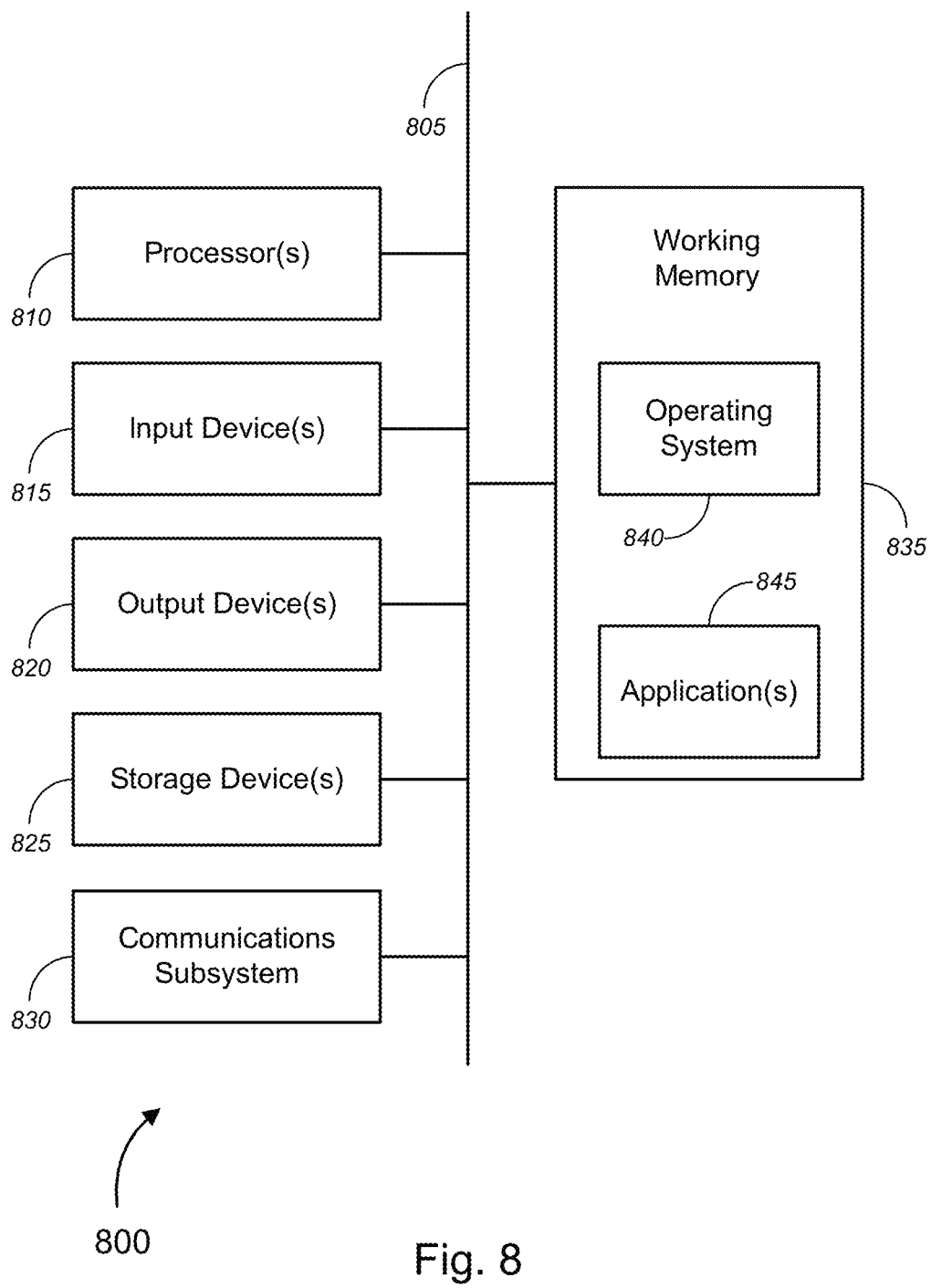
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (e.g., first computing system(s) 105, primary encoder(s) 115, secondary encoder(s) 120, content source(s) 125, second computing system(s) 150, decoder(s) 165, display(s) 170, speaker(s) 175, etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (e.g., first computing system(s) 105, primary encoder(s) 115, secondary encoder(s) 120, content source(s) 125, second computing system(s) 150, decoder(s) 165, display(s) 170, speaker(s) 175, etc.), described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire, and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
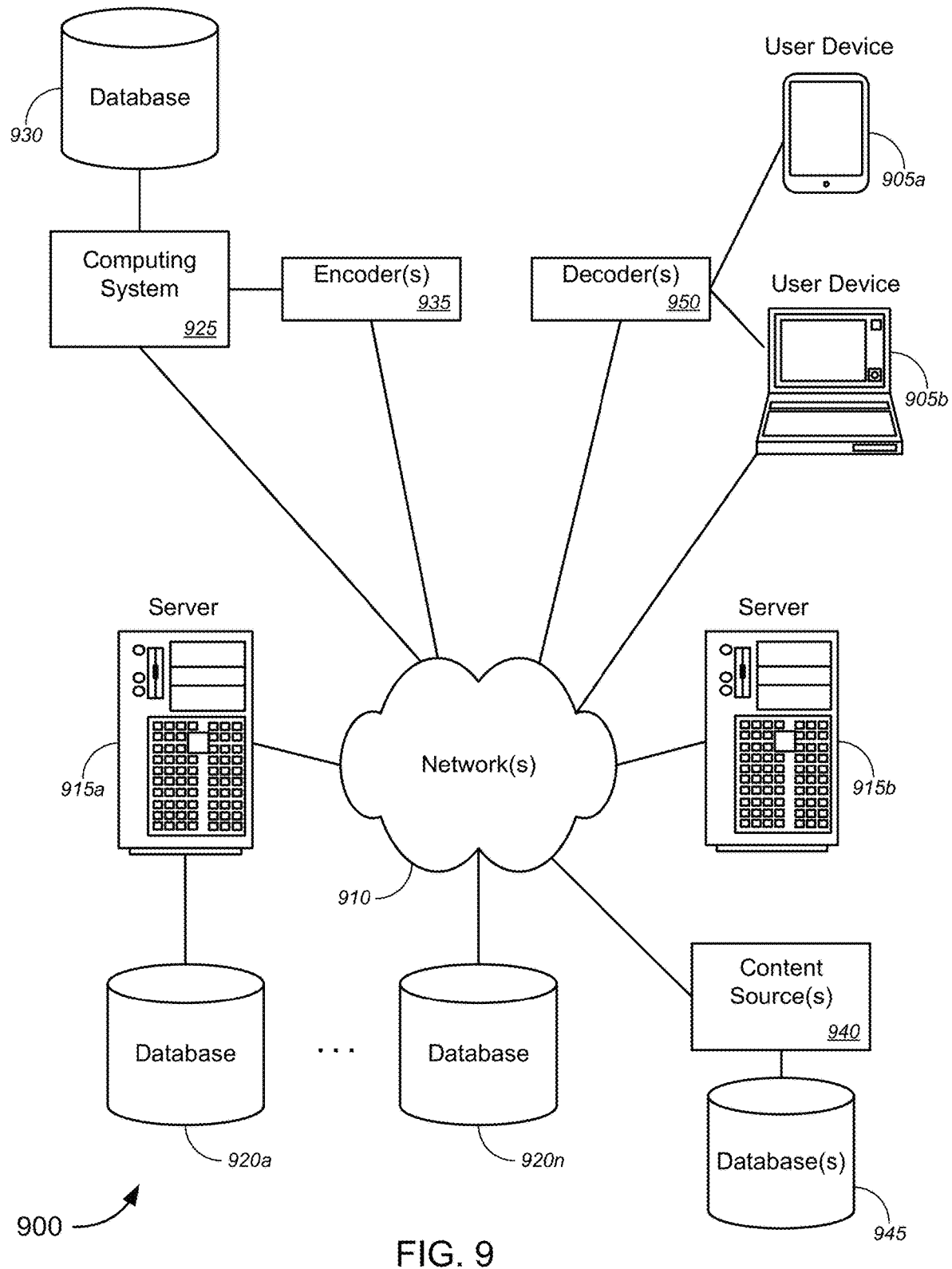
FIG. 9 is a block diagram illustrating a networked system of computers, computing systems, or system hardware architecture, which can be used in accordance with various embodiments.

As noted above, a set of embodiments comprises methods and systems for implementing encoding and decoding of media content streams, and, more particularly, methods, systems, and apparatuses for implementing encoding and decoding of live adaptive bitrate media content streams. FIG. 9 illustrates a schematic diagram of a system 900 that can be used in accordance with one set of embodiments. The system 900 can include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 910 (similar to network(s) 135, 140, and/or 145 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing encoding and decoding of media content streams, and, more particularly, for implementing encoding and decoding of live adaptive bitrate media content streams, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920*a*-920*n* (collectively, "databases 920"). The location of each of the databases 920 is discretionary: merely by way of example, a database 920*a* might reside on a storage medium local to (and/or resident in) a server 915*a* (and/or a user computer, user device, or customer device 905). Alternatively, a database 920*n* can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise a computing system 925 (similar to first computing system 105 of FIG. 1, or the like) and corresponding database(s) 930 (similar to database(s) 110 of FIG. 1, or the like). System 900 might further comprise one or more encoder(s) 935 (similar to primary encoder(s) 115 and secondary encoder(s) 120 of FIG. 1, or the like). System 900 might also comprise media content source(s) 940 (similar to the one or more media content sources 125 of FIG. 1, or the like) and corresponding database(s) 945 (similar to database(s) 130 of FIG. 1, or the like). User devices 905a and 905b may also be one or more second computing system(s) (similar to second computing system(s), user interface device(s), or user device(s) 150 of FIG. 1, or the like). Each user device 905a and 905b may include one or more decoder(s) 950 (similar to decoder(s) 165 of FIG. 1, or the like). In some cases, the one or more decoder(s) 950 might be separate from the user devices 905a and 905b.

In operation, one or more first computing systems 925 may divide a live media content stream, from one or more content sources 940, into one or more segments. Each segment might include a starting segment boundary and an ending segment boundary. The one or more first computing systems 925 might encode, using encoder(s) 935, the one or more segments of the live media content stream into one or more primary adaptive bitrate streams. The one or more first computing systems 925 might also divide the one or more segments of the live media content stream into one or more subsegments. Each subsegment might be less than a length of a corresponding segment of the one or more segments. The one or more first computing systems 925 might the encode, using encoder(s) 935, the one or more subsegments into one or more secondary adaptive bitrate streams.

According to some embodiments, one or more user devices 905a and 905b might receive a request for the live media content on a live channel. The user devices 905a and 905b might first request the one or more primary adaptive bitrate streams associated with the live media content. The user devices 905a and 905b might then determine that the one or more primary adaptive bitrate streams are not at a starting segment boundary. Based on a determination that the one or more primary adaptive bitrate streams are not at a starting segment boundary, the user devices 905a and 905b might request one or more secondary adaptive bitrate streams associated with the live media content. The user devices 905a and 905b might receive the one or more secondary adaptive bitrate streams including the one or more subsegments and decode, using decoder(s) 950, the live media content associated with the one or more secondary bitrate streams.

In some cases, the one or more subsegments might have a different starting boundary than a corresponding starting segment boundary of a corresponding segment of the one or more segments and a same ending boundary as a corresponding ending segment boundary of the corresponding segment of the one or more segments. In some cases, the one or more subsegments may be continuous subsegments, discontinuous subsegments, overlapping subsegments, and/or the like.

These and other functions of the system 900 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
dividing, using a computing system, a live media content stream into two or more segments, each segment comprising a starting segment boundary and an ending segment boundary;
encoding, using one or more primary encoders of the computing system, the two or more segments of the live media content stream into one or more primary adaptive bitrate streams;
dividing, using the computing system, the two or more segments of the live media content stream into two or more subsegments, wherein each subsegment is less than a length of a corresponding segment of the two or more segments, and wherein at least one subsegment of the two or more subsegments overlaps a next starting segment boundary of a next segment of the two or more segments; and
encoding, using one or more secondary encoders of the computing system, at least one subsegment of the two or more subsegments into one or more secondary adaptive bitrate streams.

2. The method of claim 1, wherein the one or more primary adaptive bitrate streams comprise one or more continuous segments of the live media content stream, and wherein the one or more secondary adaptive bitrate streams comprise at least one of one or more continuous subsegments of the live media content stream or one or more discontinuous subsegments of the live media content stream.

3. The method of claim 1, wherein the two or more subsegments comprise a different starting boundary than a corresponding starting segment boundary of a corresponding segment of the two or more segments and a same ending boundary as a corresponding ending segment boundary of the corresponding segment of the two or more segments.

4. The method of claim 3, wherein each subsegment of the two or more subsegments has a different subsegment starting boundary than a next subsegment starting boundary of a next subsegment.

5. The method of claim 4, wherein the next subsegment starting boundary of the next subsegment occurs a predetermined amount of time after a preceding subsegment starting boundary of a preceding subsegment.

6. The method of claim 4, wherein each subsegment of the two or more subsegments is encoded by a single encoder or a separate encoder of the one or more secondary encoders.

7. The method of claim 3, further comprising:
releasing, using the computing system, the one or more secondary encoders when the two or more subsegments reach the same ending boundary as the corresponding segment of the two or more segments.

8. The method of claim 1, wherein the two or more subsegments are transmitted unencrypted.

9. The method of claim 1, wherein the two or more subsegments are transmitted at a lower bitrate than the two or more segments.

10. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
determine that one or more primary adaptive bitrate streams for live media content are not at a starting segment boundary, wherein the one or more primary adaptive bitrate streams comprise two or more segments, each segment comprising the starting segment boundary and an ending segment boundary;
based on a determination that the one or more primary adaptive bitrate streams are not at a starting segment boundary, request one or more secondary adaptive bitrate streams associated with the live media content from one or more secondary encoders, wherein the one or more secondary adaptive bitrate streams comprise one or more subsegments, wherein each subsegment is less than a length of a corresponding segment of the two or more segments, and wherein the one or more subsegments overlap a next starting segment boundary of a next segment of the two or more segments; and
receive the one or more secondary adaptive bitrate streams comprising the one or more subsegments; and
decode the live media content associated with the one or more secondary bitrate streams.

11. The apparatus of claim 10, wherein the request for the one or more secondary adaptive bitrate streams from the one or more secondary encoders comprises requesting a secondary adaptive bitrate stream of the one or more secondary adaptive bitrate streams comprising a subsegment of the one or more subsegments with a starting subsegment boundary closest to a real-time display time of the live media content.

12. The apparatus of claim 10, wherein the one or more subsegments comprise a different starting boundary than a corresponding starting segment boundary of a corresponding segment of the two or more segments and a same ending boundary as a corresponding ending segment boundary of the corresponding segment of the two or more segments.

13. The apparatus of claim 12, wherein the set of instructions, when executed by the at least one processor, further causes the apparatus to:
determine that the one or more subsegments of the one or more secondary adaptive bitrate streams have reached the same ending boundary as the corresponding ending segment boundary of the corresponding segment;
based on a determination that the one or more subsegments of the one or more secondary adaptive bitrate streams have reached the same ending boundary, switch from at least one of the one or more secondary adaptive bitrate streams to at least one of the one or more primary adaptive bitrate streams;
receive the at least one primary adaptive bitrate stream comprising the two or more segments; and
decode the live media content associated with the at least one primary adaptive bitrate stream.

14. The apparatus of claim 13, wherein the one or more secondary adaptive bitrate streams comprising the one or more subsegments are received with a first video codec and the one or more primary adaptive bitrate streams are received with a second video codec different than the first video codec.

15. The apparatus of claim 10, wherein the one or more secondary adaptive bitrate streams comprising the one or more subsegments are received with at least one of a first bitrate and the one or more primary adaptive bitrate streams are received with at least one of a second bitrate different than the first bitrate.

16. The apparatus of claim 10, wherein, when the one or more subsegments overlap the next starting segment boundary of the next segment of the two or more segments, the set of instructions, when executed by the at least one processor, further causes the apparatus to:
drop one or more overlapping subframes of the one or more subsegments, wherein the one or more overlapping subframes overlap between the one or more subsegments and the next segment of the two or more segments.

17. The apparatus of claim 10, wherein, when the one or more subsegments overlap the next starting segment boundary of the next segment of the two or more segments, the set of instructions, when executed by the at least one processor, further causes the apparatus to:
request and receive at least one primary adaptive bitrate stream comprising the next segment of the two or more segments;
determine whether one or more overlapping subframes of the one or more subsegments are behind one or more real-time frames of the next segment of the two or more segments;
based on a determination that the one or more overlapping subframes of the one or more subsegments are behind the one or more real-time frames of the next segment, decode and display the one or more overlapping subframes faster to catch up to the one or more real-time frames of the next segment; and
based on a determination that the one or more overlapping subframes of the one or more subsegments have caught up to the one or more real-time frames of the next segment, switch from the one or more secondary adaptive bitrate streams to the one or more primary adaptive bitrate streams.

18. The apparatus of claim 10, wherein the set of instructions, when executed by the at least one processor, further causes the apparatus to:

determine whether one or more real-time frames of the next segment of the two or more segments are not available;

based on a determination that the one or more real-time frames of the next segment of the two or more segments are not available, decode and display at least one of one or more subframes of the one or more subsegments slower until the one or more real-time frames are available or repeat one or more prior subframes of the one or more subsegments until the one or more real-time frames are available; and based on a determination that the one or more real-time frames are available, switch from at least one of the one or more secondary adaptive bitrate streams to at least one of the one or more primary adaptive bitrate streams.

19. The apparatus of claim 10, wherein the two or more segments comprise a header at the starting segment boundary, wherein each header indicates one or more additional decodable segment boundaries indicating one or more additional locations within a corresponding segment where the apparatus can start decoding the live media content.

20. A system, comprising:
a first computing system, comprising:
one or more primary encoders;
one or more secondary encoders;
at least one first processor; and
a first non-transitory computer readable medium communicatively coupled to the at least one first processor, the first non-transitory computer readable medium having stored thereon computer software comprising a first set of instructions that, when executed by the at least one first processor, causes the first computing system to:
divide a live media content stream into two or more segments, each segment comprising a starting segment boundary and an ending segment boundary;
encode, using the one or more primary encoders, the two or more segments of the live media content stream into one or more primary adaptive bitrate streams;
divide the two or more segments of the live media content stream into two or more subsegments, wherein each subsegment is less than a length of a corresponding segment of the two or more segments, and wherein at least one subsegment of the two or more subsegments overlaps a next starting segment boundary of a next segment of the two or more segments; and
encode, using the one or more secondary encoders, at least one subsegment of the two or more subsegments into one or more secondary adaptive bitrate streams; and a second computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the second computing system to:
request one or more primary adaptive bitrate streams associated with live media content from the one or more primary encoders;
determine that the one or more primary adaptive bitrate streams are not at the starting segment boundary;
based on a determination that the one or more primary adaptive bitrate streams are not at a starting segment boundary, request one or more secondary adaptive bitrate streams associated with the live media content from one or more secondary encoders;
receive the one or more secondary adaptive bitrate streams comprising at least one subsegment of the two or more subsegments; and
decode the live media content associated with the one or more secondary bitrate streams.

* * * * *